United States Patent
Martinot et al.

(10) Patent No.: US 8,358,988 B2
(45) Date of Patent: Jan. 22, 2013

(54) INTERFACE BETWEEN CHIP RATE PROCESSING AND BIT RATE PROCESSING IN WIRELESS DOWNLINK RECEIVER

(75) Inventors: Lidwine Martinot, Cottenham (GB); Deepak Mathew, Wilmington, MA (US); Krishnan Vishwanathan, Newburgh, NY (US); Eric Aardoom, Framingham, MA (US); Aiguo Yan, North Andover, MA (US); Timothy Fisher-Jeffes, Cambridge (GB)

(73) Assignee: MediaTek Inc., Hsin-Chu (TW)

( * ) Notice: Subject to any disclaimer, the term of this patent is extended or adjusted under 35 U.S.C. 154(b) by 960 days.

(21) Appl. No.: 11/529,146

(22) Filed: Sep. 28, 2006

(65) Prior Publication Data

US 2008/0080443 A1    Apr. 3, 2008

(51) Int. Cl.
    H04B 1/18        (2006.01)
(52) U.S. Cl. ............ 455/187.1; 455/423; 455/552.1; 370/342; 370/320; 370/335; 370/441
(58) Field of Classification Search ............ 455/403, 455/187.1, 423, 552.1; 370/227, 310, 342, 370/232, 412, 428; 375/130, 141, 147, 148, 375/340, 346, 260; 714/702
See application file for complete search history.

(56) References Cited

U.S. PATENT DOCUMENTS

| | | | |
|---|---|---|---|
| 6,798,826 B1 * | 9/2004 | Shiu et al. ............ | 375/147 |
| 2002/0015437 A1 * | 2/2002 | Li et al. ............ | 375/146 |
| 2002/0159549 A1 * | 10/2002 | Aoyama et al. ........ | 375/346 |
| 2003/0043886 A1 * | 3/2003 | Yu ................ | 375/141 |
| 2003/0091130 A1 * | 5/2003 | Terashima et al. ...... | 375/340 |
| 2003/0133431 A1 * | 7/2003 | Rudolf .............. | 370/342 |
| 2003/0235166 A1 * | 12/2003 | Son et al. ............ | 370/334 |
| 2004/0141548 A1 * | 7/2004 | Shattil ............. | 375/146 |

(Continued)

FOREIGN PATENT DOCUMENTS

| EP | 1 161 013 | 12/2001 |
|---|---|---|
| EP | 1 223 776 | 7/2002 |

(Continued)

OTHER PUBLICATIONS

Martinez, Ed, "Introduction to TD-SCDMA on the MRC6011 RCF Device", Freescale Semiconductor, Application Note, AN2684, Rev. 1 Nov. 2004, pp. 1-16.

(Continued)

Primary Examiner — Chuong A Ngo
(74) Attorney, Agent, or Firm — Fish & Richardson P.C.

(57) ABSTRACT

A bit rate processor in a wireless system includes a front end processor to process physical channel data and to generate encoded transport channel data, a transport channel buffer to hold the encoded transport channel data, and a back end processor to process the encoded transport channel data from the transport channel buffer and to generate decoded transport channel bits. The front end process may include a frame buffer that receives the physical channel data, a first stage to de-map the physical channel data, an intermediate frame buffer that receives the de-mapped physical channel data, and a second stage to process the de-mapped physical channel data and to provide the encoded transport channel data. The back end processor may include a third stage, including a scaling circuit to scale the encoded transport channel data, a decoder to decode the scaled transport channel data, a CRC checker and an output buffer.

27 Claims, 37 Drawing Sheets

U.S. PATENT DOCUMENTS

| | | | |
|---|---|---|---|
| 2004/0252793 | A1 | 12/2004 | Chang |
| 2005/0164732 | A1 | 7/2005 | Denk et al. |
| 2005/0254441 | A1* | 11/2005 | Levi et al. ............. 370/277 |
| 2006/0010188 | A1 | 1/2006 | Solomon et al. |
| 2006/0084425 | A1 | 4/2006 | Cheng et al. |
| 2009/0168683 | A1* | 7/2009 | Franceschini et al. ........ 370/312 |

FOREIGN PATENT DOCUMENTS

WO 03/013018 2/2003

OTHER PUBLICATIONS

Siemens, "*White Paper TD-SCDMA: the Solution for TDD bands*", pp. 1-39, Mar. 2004.

Li, Bo et al., "*Recent Advances on TD-SCDMA in China*", IEEE Communications Magazine, Jan. 2005 pp. 30-37.

Vollmer Marius, et al., "*Comparative Study of Joint-Detection Techniques for TD-CDMA Based Mobile Radio Systems*", IEEE Journal on Selected Areas in Communications, vol. 19, No. 8, Aug. 2001, pp. 1461-1475.

Sheng, Chengke, et al., "*Spatial Temporal Processing in TD-SCDMA*", Motorola Freescale Semiconductor, Inc., White Paper, AN2904, Rev. 0, Sep. 2004, pp. 1-23.

Sheng, Chengke, et al., "*ZF-BLE Joint Detection for TD-SCDMA*", Motorola Freescale Semiconductor, Inc., pp. 1-20, Feb. 19, 2004.

ST Journal of System Research, Wireless Communications, vol. 1—No. 1, Feb. 2004, pp. 1-124.

* cited by examiner

INTERFACE BETWEEN CHIP RATE PROCESSING AND BIT RATE PROCESSING IN WIRELESS DOWNLINK RECEIVER

FIELD OF THE INVENTION

This invention relates to wireless communication systems and, more particularly, to a downlink receiver bit rate processor for use in wireless systems. The invention is particularly useful in TDSCDMA wireless systems, but is not limited to TDSCDMA systems.

BACKGROUND OF THE INVENTION

TDSCDMA (Time Division Synchronous Code Division Multiple Access) is a wireless radio standard for the physical layer of a 3G (third generation) air interface. Different from WCDMA and CDMA2000, which adopt a frequency division duplex, TDSCDMA is designed for time division duplex/multiple access (TDD/TDMA) operation with synchronous CDMA technology.

TDSCDMA uses time domain duplexing in combination with multiple access techniques to support both symmetrical and asymmetrical traffic. The variable allocation of time slots for uplink or downlink traffic allows TDSCDMA to meet asymmetric traffic requirements and to support a variety of users. In TDSCDMA systems, multiple access techniques employ both unique codes and time signatures to separate the users in a given cell. The TDSCDMA standard defines a frame structure with three layers: the radio frame, the subframe and the time slot. The radio frame is 10 ms. The subframe is 5 ms. and is divided into seven time slots. A time slot has four parts: a midamble, two data fields on each side of the midamble and a guard period. The receiver uses the midamble to perform channel estimation.

In CDMA systems, many users access the same channel simultaneously. Each user is separated from the others by a code known as the spreading code. However, each new user added to the system produces interference with the other users. In CDMA systems, this multiple access interference (MAI) is the limiting factor in system capacity.

Multiple access interference equally affects all users in a CDMA system. To deal with this, other systems use detection schemes such as the rake receiver. However, rake receivers are suboptimal because they consider only the user's signal information in the detection process, with no attempt to characterize the interference from the other users. By contrast, joint detection algorithms process all users in parallel and thus include the interference information from the other users. Joint detection schemes are complex and computationally intensive. Complexity grows exponentially as the number of codes increases. Joint detection is well-suited to TDSCDMA systems because the number of users in a time slot is limited to 16. The result is a joint detector of reasonable complexity.

In traditional communication systems, the baseband receiver includes two main components: an inner receiver, also known as an equalizer or a chip rate processor, which mitigates the effects of multipath and interference, and an outer receiver which performs channel decoding and other symbol rate processing. Circuitry for implementing a TDSCDMA baseband processor may use different approaches, ranging from a programmable digital signal processor to application-specific integrated circuits (ASICs). The programmable digital signal processor has the advantage of flexibility for different applications but may not have sufficient computation speed to process TDSCDMA signals in real time. ASICs may have higher computation speed but have limited flexibility for different applications and different processing algorithms.

Accordingly, there is a need for TDSCDMA architectures and implementations which achieve high computation speed, flexibility and programmability.

SUMMARY OF THE INVENTION

According to a first aspect of the invention, a bit rate processor to process physical channel data in a wireless system is provided. The bit rate processor comprises a frame buffer configured to hold a frame of physical channel data, the frame buffer having first and second sections, each for holding a subframe of physical channel data, the frame buffer configured to receive physical channel data produced by a joint detection operation; and a processing circuit to process the frame of physical channel data and to provide in response thereto decoded transport channel bits.

According to a second aspect of the invention, a method for bit rate processing of physical channel data in a wireless system is provided. The method comprises providing a frame buffer configured to hold a frame of physical channel data, the frame buffer having first and second sections, each for holding a subframe of physical channel data; writing physical channel data to the frame buffer; receiving control parameters that correspond to the physical channel data; and processing the stored physical channel data from the frame buffer in accordance with the control parameters.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
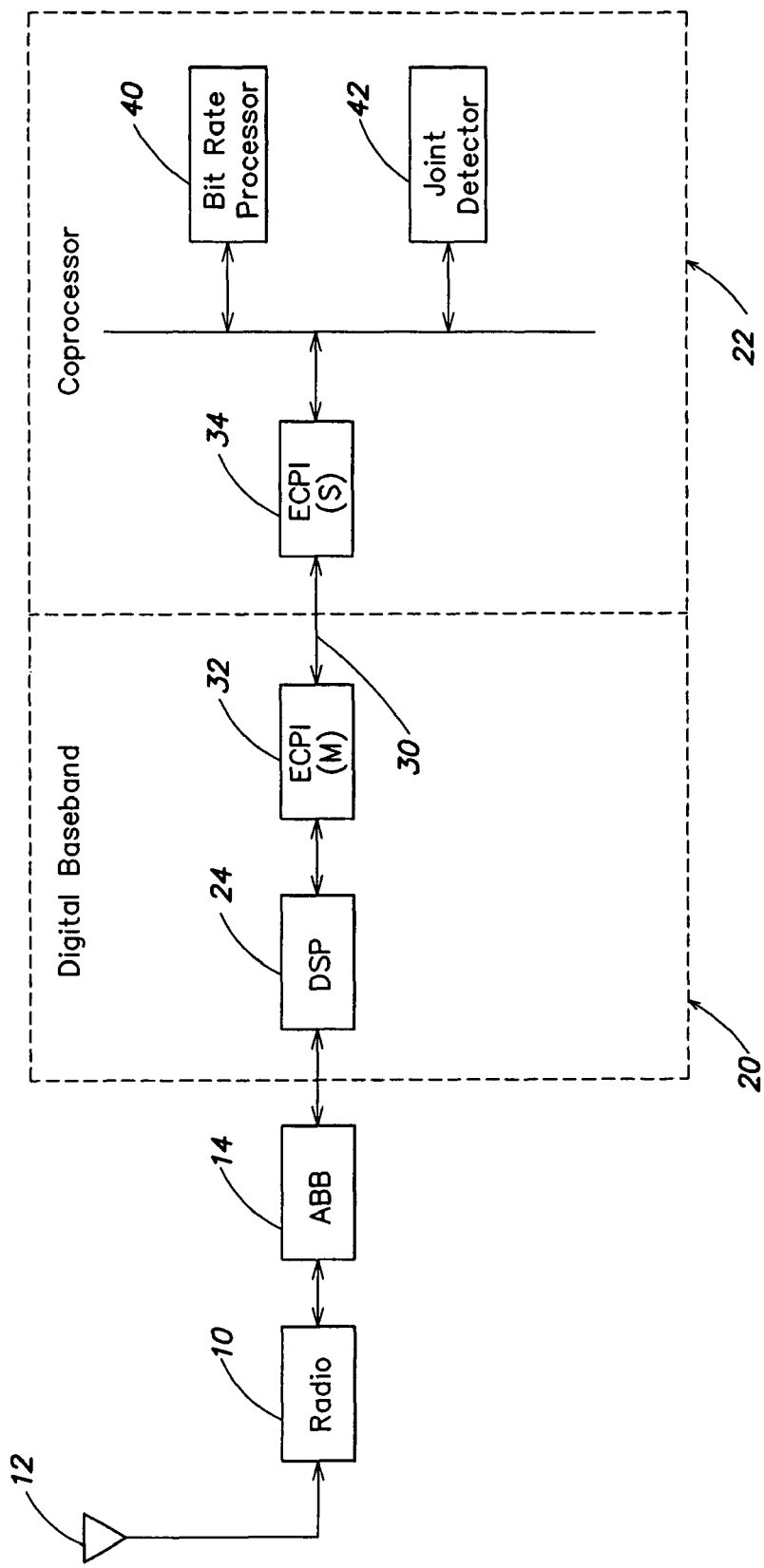
FIG. 1 is a simplified block diagram of a TDSCDMA receiver in accordance with an embodiment of the invention.

A block diagram of a downlink receiver for a TDSCDMA wireless device is shown in FIG. 1. A radio 10 receives signals via an antenna 12 and supplies the signals to an analog baseband (ABB) circuit 14. The analog baseband circuit processes the received signals in the analog domain and supplies a digital signal at its output. The receiver further includes a digital baseband circuit 20 and a coprocessor 22. The digital baseband circuit 20 may include a control processor such as a programmable digital signal processor (DSP) 24. DSP 24 may include a core processor, memory, a DMA controller and various interface circuits. DSP 24 may communicate with coprocessor 22 via an external coprocessor bus 30 which is controlled by an external coprocessor interface (ECPI) master 32 in digital baseband circuit 20 and an ECPI slave 34 in coprocessor 22. Coprocessor 22 may include a bit rate processor 40 and a joint detector 42. Bit rate processor 40 and joint detector 42 communicate with DSP 24 via external coprocessor bus 30.

In some embodiments, the components of coprocessor 22 may be incorporated in the digital baseband circuit 20 with DSP 24. In these embodiments, DSP 24, bit rate processor 40 and joint detector 42 may be interconnected by one or more internal buses, and external coprocessor bus 30 is not required.

Figure 2:
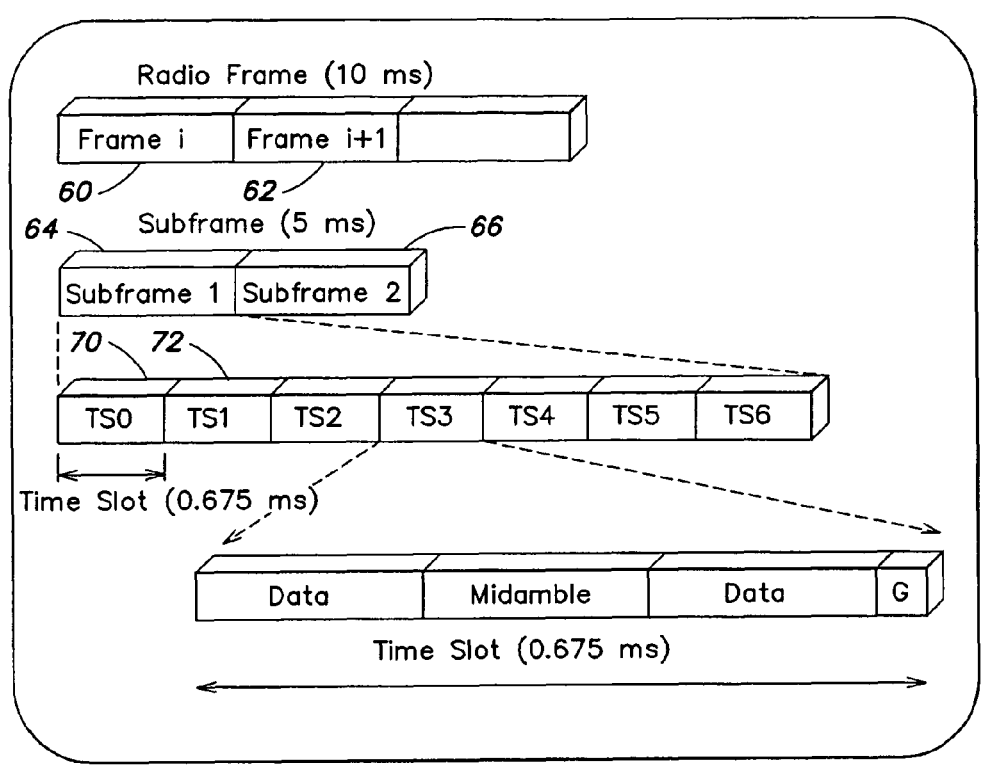
FIG. 2 is a schematic representation of the TDSCDMA data structure.

A schematic representation of the TDSCDMA data structure is shown in FIG. 2. Data is transmitted as a series of radio frames 60, 62, etc., each having a duration of 10 ms (milliseconds). Each radio frame is divided into two subframes 64 and 66, each having a duration of 5 ms. Each subframe is made up of seven time slots 70, 72, etc, each having a duration of 0.675 ms. Each time slot includes four parts, a midamble with 144 chips duration, two data fields with 352 chips duration before and after the midamble, followed by a guard period of 16 chips. The midamble carries known data and is used by the receiver to perform channel estimation. The seven time slots in each subframe may be divided between uplink and downlink traffic, according to the traffic in each direction.

The joint detector processes the received data for each downlink time slot and generates physical channel data. Each time slot may include up to 16 users and up to 16 spreading codes. The major function of the joint detector is to solve the linear equation $$(T^H T+\sigma^2 I)x=T^H r,$$

where T is a matrix that represents the channel characteristics, r is a vector that represents the received signal and $\sigma^2$ represents noise. The joint detector processes all user signals in parallel and thus includes interference information from other users. The joint detector separates physical channel data according to user. In some embodiments, joint detection operations may be divided between joint detector 42 and DSP 24. For example, DSP 24 can perform channel estimation and post processing, and joint detector 42 can perform matrix computations.

Referring again to FIG. 1, bit rate processor 40 and joint detector 42 are circuits that perform computations under control of DSP 24. Joint detector 42 receives data, control parameters and control signals, such as triggers to begin processing, from DSP 24. Joint detector 42 processes the data and returns the processed data to DSP 24. Similarly, bit rate processor 40 receives physical channel data, control parameters and control signals, such as triggers to begin processing, from DSP 24. Bit rate processor 40 processes the data in accordance with the control parameters and returns decoded transport channel bits to DSP 24. As described below, the baseband processing functions may be divided between DSP 24 and coprocessor 22. DSP 24 is programmable and can perform functions that can be modified and updated with relative ease, whereas coprocessor 22 is hard wired and performs fixed functions, with the parameters of the fixed functions being programmable. For example, the processing circuit may be configured to evaluate physical channel data written to the frame buffer in response to the control parameters. In general, joint detector 42 and bit rate processor 40 perform computation-intensive functions that are less likely to change, whereas DSP 24 performs functions that are less computation-intensive and which may be changed or which may be performed differently by different users.

Figure 3:
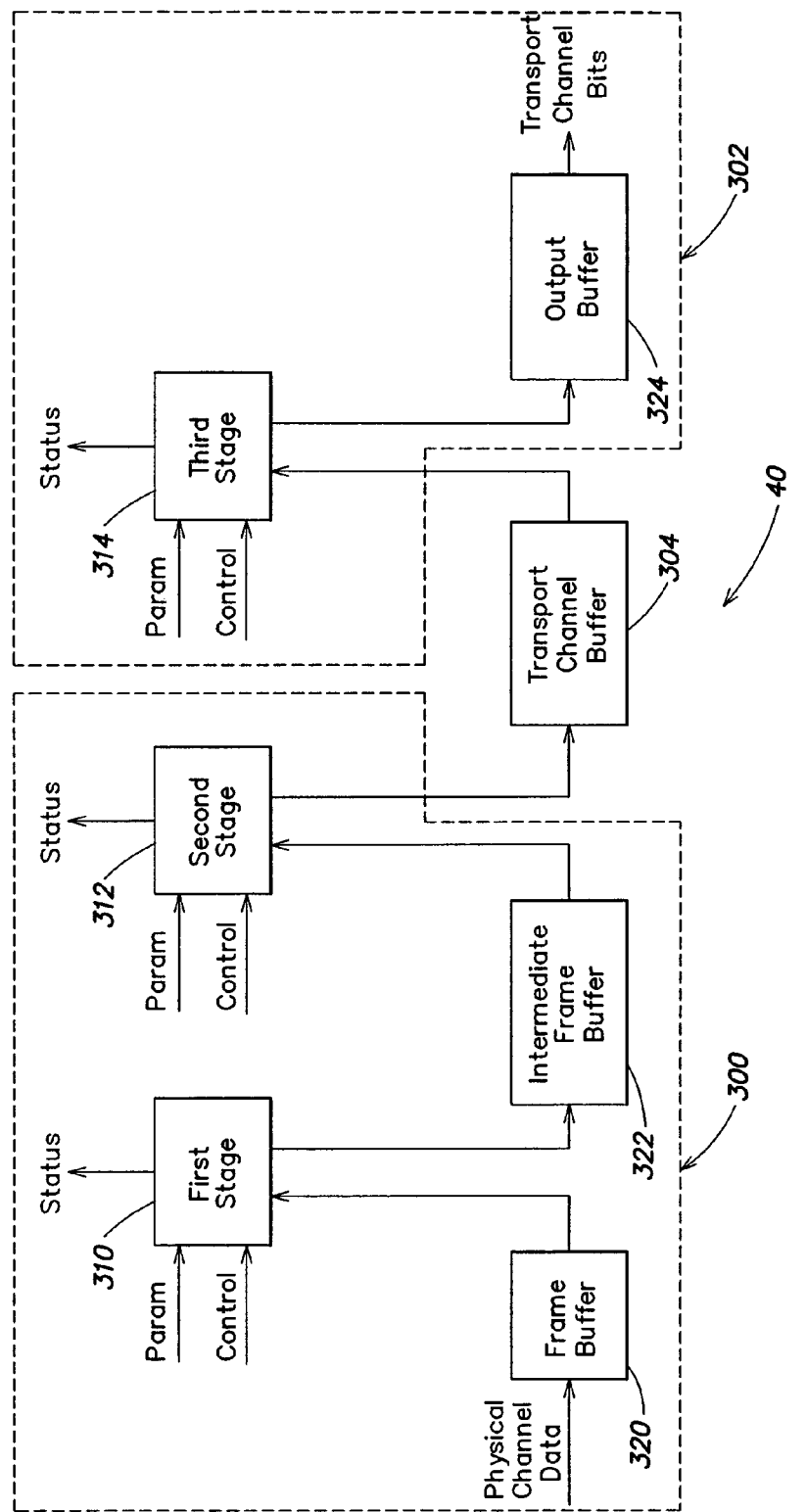
FIG. 3 is a simplified block diagram of a bit rate processor in accordance with an embodiment of the invention.

A simplified block diagram of bit rate processor 40 in accordance with an embodiment of the invention is shown in FIG. 3. Bit rate processor 40 includes a front end processor 300, a back end processor 302 and a transport channel buffer 304 coupled between front end processor 300 and back end processor 302. Front end processor 300 receives physical channel data from DSP 24 (FIG. 1) and provides encoded transport channel data to transport channel buffer 304. The physical channel data is generated by joint detector 42 and is provided to bit rate processor 40 by way of DSP 24. The front end processor 300 involves processing at the coded composite transport channel (CCTrCH) level. The back end processor 302 processes the encoded transport channel data from transport channel buffer 304 and provides decoded transport channel bits to DSP 24. The back end processor 302 operates on a transport channel (TrCH) basis. In cases where the physical channel data contains more than one coded composite transport channel, the coded composite transport channels are processed serially by the front end processor 300. In cases where each coded composite transport channel contains more than one transport channel, the transport channels are processed serially by the back end processor 302.

As shown in FIG. 3, the architecture of bit rate processor 40 includes computation stages and buffer memories. In the embodiment of FIG. 3, bit rate processor 40 includes a first stage 310 and a second stage 312 in front end processor 300, and a third stage 314 in back end processor 302. Thus, front end processor 300 includes first stage 310, second stage 312, a frame buffer 320 and an intermediate frame buffer 322. Back end processor 302 includes third stage 314 and an output buffer 324. The operations performed by the first, second and third stages are discussed below.

Frame buffer 320 receives physical channel data generated by joint detector 42 (FIG. 1) and supplies the physical channel data to first stage 310 for processing. Intermediate frame buffer 322 receives de-mapped physical channel data from first stage 310 and supplies the de-mapped physical channel data to second stage 312. Transport channel buffer 304 receives encoded transport channel data from second stage 312 and supplies the encoded transport channel data to third stage 314. Output buffer 324 receives decoded transport channel bits from third stage 314 and supplies the decoded transport channel bits to DSP 24. Each of frame buffer 320, intermediate frame buffer 322, transport channel buffer 304 and output buffer 324 is an independent, separately addressable memory. In some embodiments, these four buffers can be replaced by one larger memory or by another configuration of buffers.

As further shown in FIG. 3, first stage 310, second stage 312 and third stage 314 each receive parameters and control signals from DSP 24. The parameters specify how the data is processed in each of the stages, and the control signals control processing. For example, a control signal from DSP 24 may notify bit rate processor 40 that frame buffer 320 has been filled with data and that processing of the data can begin. The first and third stages also provide status signals to DSP 24, for example to indicate that a processing task has been completed.

Figure 4:
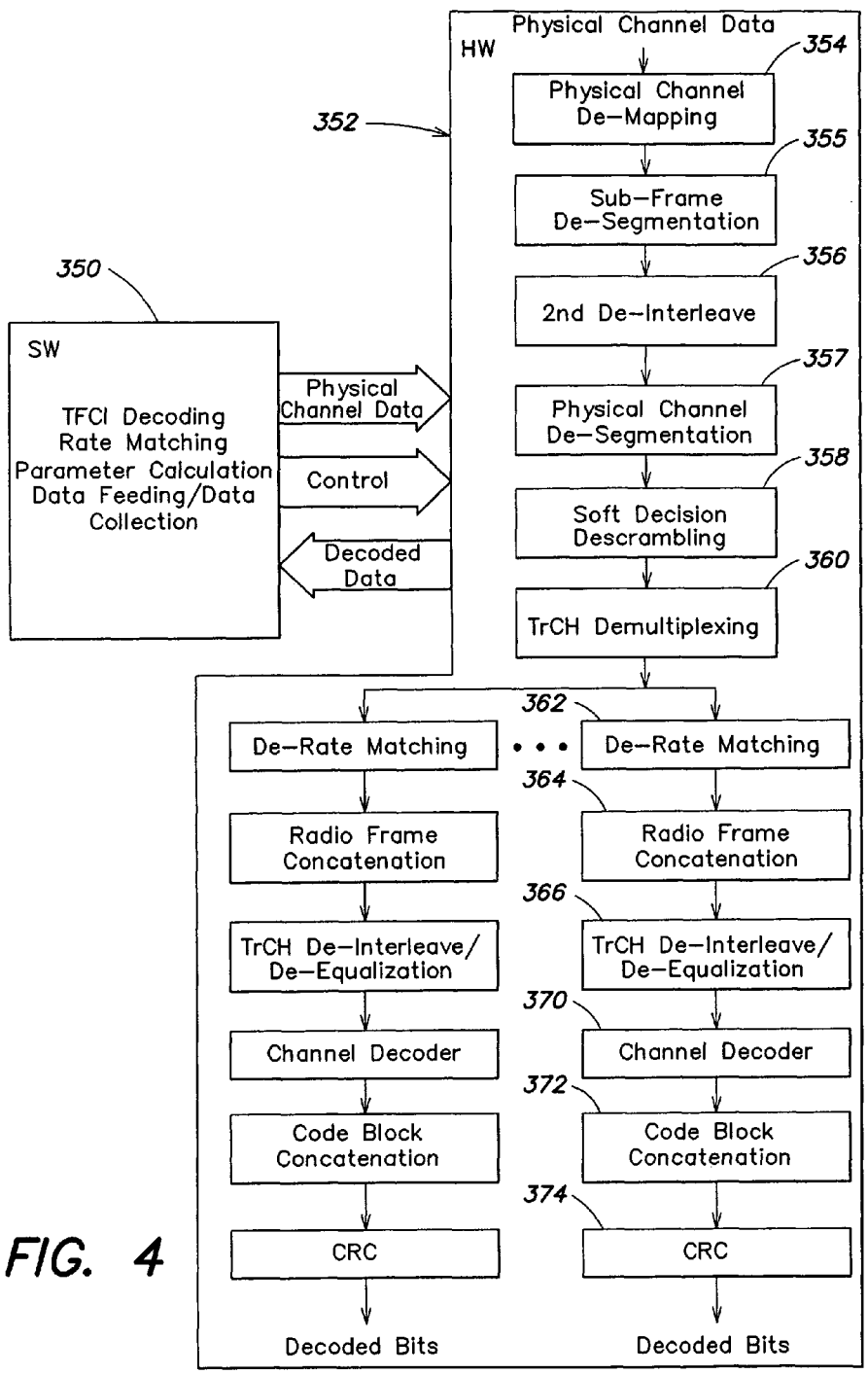
FIG. 4 is a flow diagram that shows operations performed by the bit rate processor.

Operations associated with bit rate processing are illustrated in the flowchart of FIG. 4. Block 350 indicates operations performed by the software in the digital signal processor, and block 352 indicates operations performed by bit rate processor 40 in coprocessor 22. The DSP 24 performs rate matching parameter computation and decoding of control channels, and also supplies physical channel data to bit rate processor 40. In bit rate processor 40, physical channel de-mapping step 354 and subframe de-segmentation step 355 are performed by first stage 310. The second de-interleaving, or CCTrCH de-interleaving step 356, physical channel de-segmentation step 357, soft decisions descrambling step 358, transport channel demultiplexing step 360, de-rate matching step 362, radio frame concatenation step 364 and transport channel de-interleaving/de-equalization step 366, are performed by second stage 312. Channel decoding step 370, code block concatenation step 372 and CRC checking step 374 are performed by third stage 314. Thus, second stage 312 and third stage 314 each perform more than one operation of the bit rate processing. As shown, the data is split up into transport channels in transport channel demultiplexing step 360.

Figure 5A:
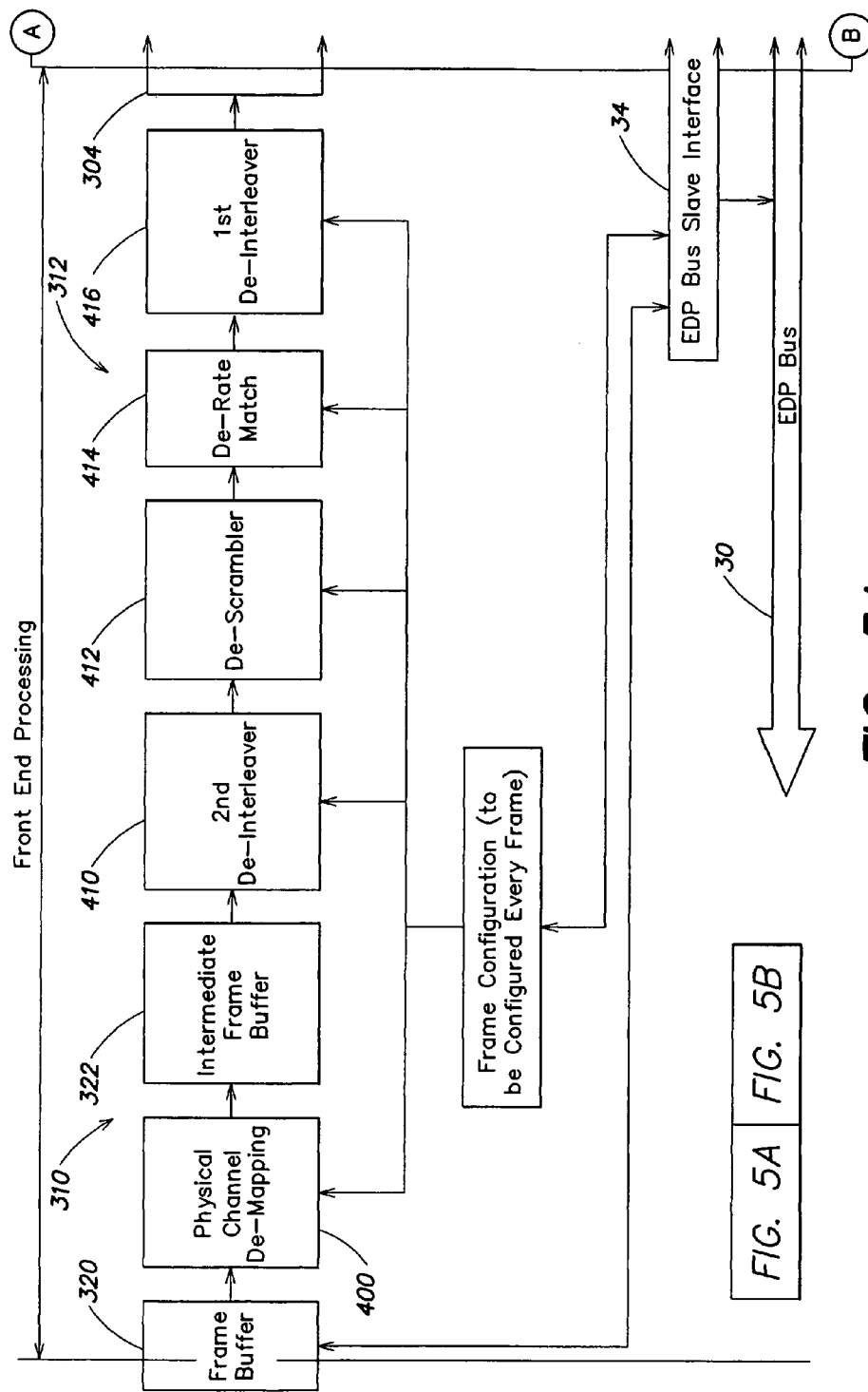
FIG. 5 is a block diagram of an implementation of the bit rate processor in accordance with an embodiment of the invention.
Figure 5B:
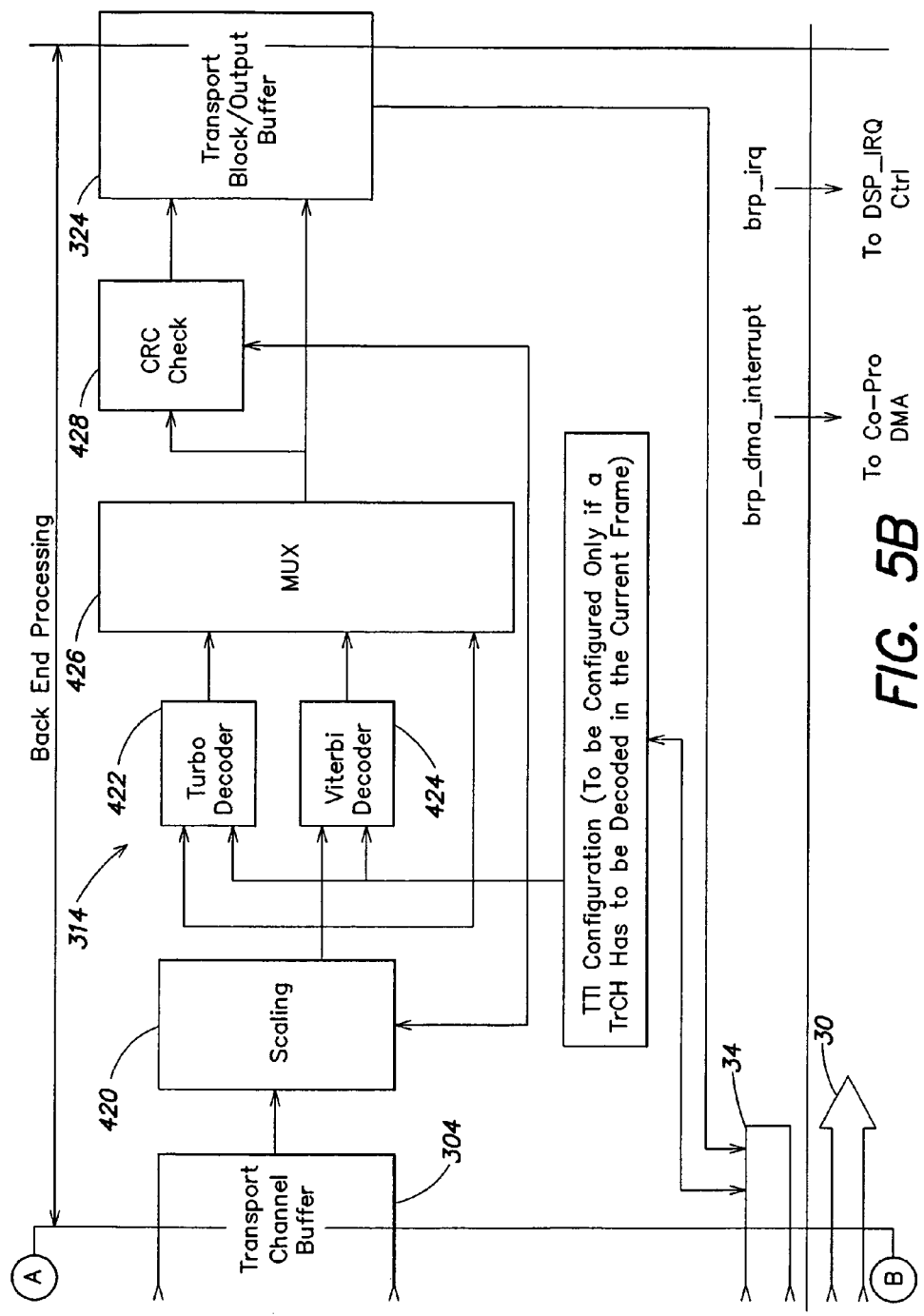

An implementation of bit rate processor 40 is shown in FIG. 5. As shown, first stage 310 includes a physical channel de-mapping engine 400. Second stage 312 includes a second de-interleaver 410, a descrambler 412, a de-rate matching engine 414, and a first de-interleaver 416. Third stage 314 includes a scaling circuit 420, a turbo decoder 422, a viterbi decoder 424, a multiplexer 426 and a CRC checker 428. Third stage 314 may perform turbo decoding, viterbi decoding, or no decoding. Parameters and control signals are provided to bit rate processor 40 via ECP bus 30 and ECPI slave interface 34.

First stage 310 of the bit rate processor includes the de-mapping engine 400 in the embodiment of FIG. 5. The de-mapping engine 400 reads physical channel data from the frame buffer 320 and writes de-mapped physical channel data to the intermediate frame buffer 322. A dedicated frame buffer 320, which is not used for storage of other data, reduces constraints placed on the DSP 24. By placing the intermediate frame buffer 322 immediately after the de-mapping engine 400, the frame buffer 320 can be emptied very early in the bit rate processing operation. Using a "frame buffer empty" interrupt, DSP 24 can overlap the loading of the frame buffer with the bit rate processing of a previous frame. This provides DSP 24 with flexibility to manage system bus bandwidths and frame throughputs. The frame buffer 320 is divided into areas for storing two subframes. The base address of each subframe is independent of frame content. By using concurrent de-mapping engines, the subframes can be simultaneously de-mapped and the subframe concatenation task can be absorbed without any penalty.

Second stage 312 of the bit rate processor performs several operations of the receiver chain. By using a streaming interface between tasks rather than dedicated memories for each of the tasks, substantial memory space is saved. The TDSCDMA standard specifies the size of the transport time interval (TTI) memory at the input of de-rate matching as 6.6 times the output data rate. This would place the TTI memory at the input of the de-rate matching engine. By positioning the de-rate matching engine 414 in the second stage 312, more than fifty percent in memory space is saved. By placing the transport channel de-interleaver at the input of the transport channel buffer 304 and using a wider transport channel buffer memory with byte selects, the transport channel de-interleaver implementation is simplified as compared to an address lookup function at the output.

Third stage 314 of the bit rate processor includes the decoder, which performs the most computationally complex task in the bit rate processor. By isolating this task in the third stage 314, the DSP 24 has the flexibility to bypass the tasks prior to the decoder. By placing the transport channel buffer 304 under control of DSP 24, DSP 24 can control the decoding channels and their sequence or can decide not to activate decoding at all if channel decoding is not required for a particular frame.

By using output buffer 324 with two banks, the bit rate processor can hold the results of two frames of output data. The DSP thus has 10 ms more time to read the outputs. This helps the DSP 24 to manage system bus bandwidth more efficiently.

The architecture of the bit rate processor shown in FIG. 3 facilitates the use of stage triggers and other special modes that provide flexibility to the DSP 24. Every stage in the bit rate processor has an associated trigger register. Advantages of using the trigger register include giving the DSP 24 scheduling control over the stages of the bit rate processor, building a pause function around the stage triggers to halt the bit rate processor and read memory contents for debug, and the ability to bypass the third stage when decoding is not required. Since the decoder is computationally the most intensive, there may be applications where the DSP can perform the tasks associated with first stage 310 and second stage 312 and use only third stage 314. The DSP loads the transport channel buffer 304 to achieve this operation. This situation may arise when certain application-specific requirements render the earlier stages irrelevant or the DSP 24 decides to use a different algorithm for one or more of the earlier tasks.

Frame Buffer

Figure 6:
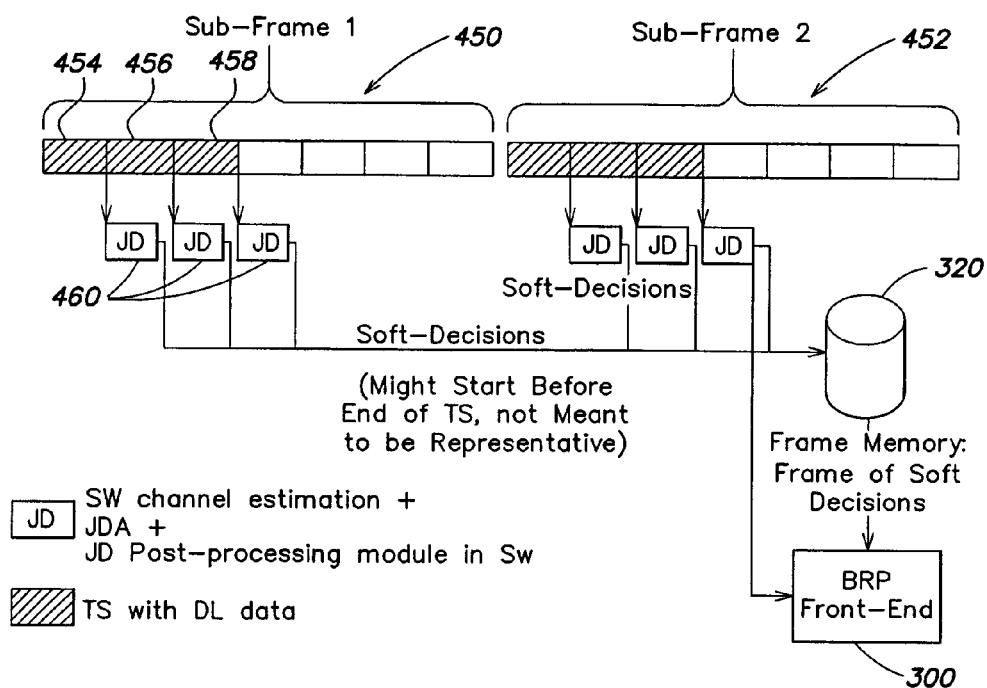
FIG. 6 is a schematic representation of the interface between the joint detector and the bit rate processor in accordance with an embodiment of the invention.

The inputs to bit rate processor 40 from joint detection operations are illustrated in the schematic diagram of FIG. 6. Subframes 450 and 452 each have time slots 454, 456 and 458 with downlink data. Additional time slots of each subframe may be used for uplink data or may be unused. In one embodiment, each subframe may include up to five downlink time slots. The joint detector 42 processes received data on a time slot basis. In FIG. 6, JD blocks 460 represent all joint detection operations, including channel estimation, processing performed by joint detector 42 and joint detection post processing by DSP 24. The result of the joint detection operations is a set of physical channel data, in the form of soft decisions, for a selected user equipment (UE). In one embodiment, each soft decision is one byte. The JD operations are completed for each time slot of each subframe, and the soft decisions for each time slot are written to frame buffer 320 as they are completed. In the current embodiment, only soft decisions corresponding to data, and no control bits, are written to frame buffer 320. The control information, including TFCI (Transport Format Combination Indicator), TPC (Transport Power Control) and SS (Synchronization Shift), can be removed by DSP 24 and processed as necessary.

The active code detection (ACD) which is part of joint detection may determine which codes among the potential active codes are indeed active. However, this mechanism may not be entirely reliable and can detect an inactive code as active and vice-versa. Only the decoded TFCI tells which user equipment codes were indeed present. The TFCI may not be available until after the last downlink time slot of the second subframe 452. Therefore when soft decisions are transferred to bit rate processor 40 on a time slot basis, the bit rate processor supports the following cases: (1) the bit rate processor may have to discard some of the already received data which were mapped on a code determined by the ACD to be active but which is not active; (2) the bit rate processor may have to pad other data with zeros in the case where the ACD has incorrectly discarded one of the codes of the user equipment; and (3) all data received on a burst basis are kept when, in all time slots of the frame, all user equipment data and only user equipment data has been transferred to bit rate processor 40.

Figure 7:
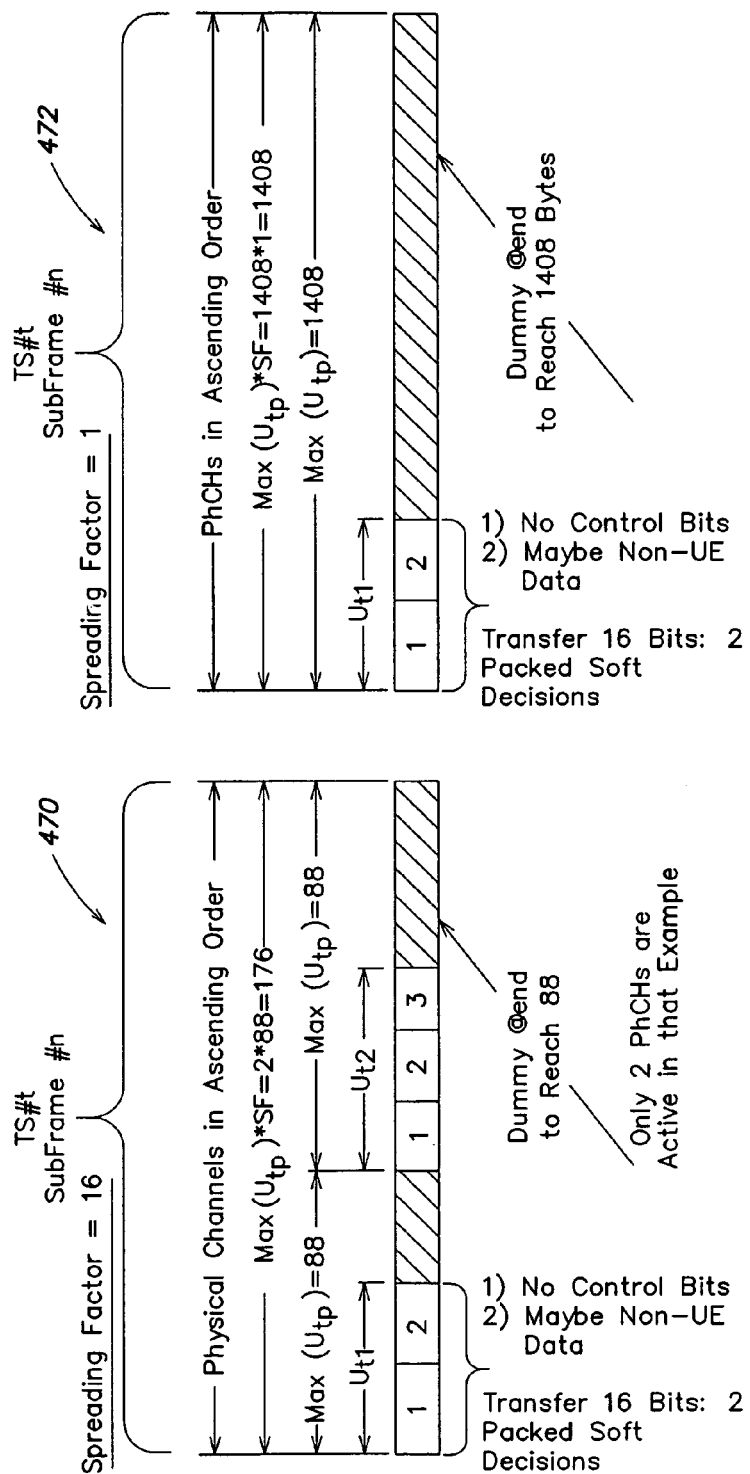
FIG. 7 is a schematic diagram that illustrates the format of inputs to the frame buffer.

An example of the format of inputs to frame buffer 320 from DSP 24 is shown in FIG. 7. A time slot 470 has a spreading factor of 16, and a time slot 472 as a spreading factor of one. In time slot 470, the data for up to 16 physical channels appears in ascending order with respect to the physical channel number. The size of the data per spreading factor is fixed at 88 bytes in this example. In time slot 470, a first physical channel has two soft decisions, and a second physical channel has three soft decisions. Dummy data is inserted as necessary to reach 88 bytes for each physical channel. It will be understood that an actual operating example is likely to have more soft decisions in each physical channel. Time slot 472 has a single spreading code and a data size of 1408 bytes. Dummy data may be inserted to reach 1408 bytes.

The current embodiment of the bit rate processor supports up to five time slots and up to 66 physical channels. The bit rate processor further supports any distribution of physical channels across the time slots.

Figure 7A:
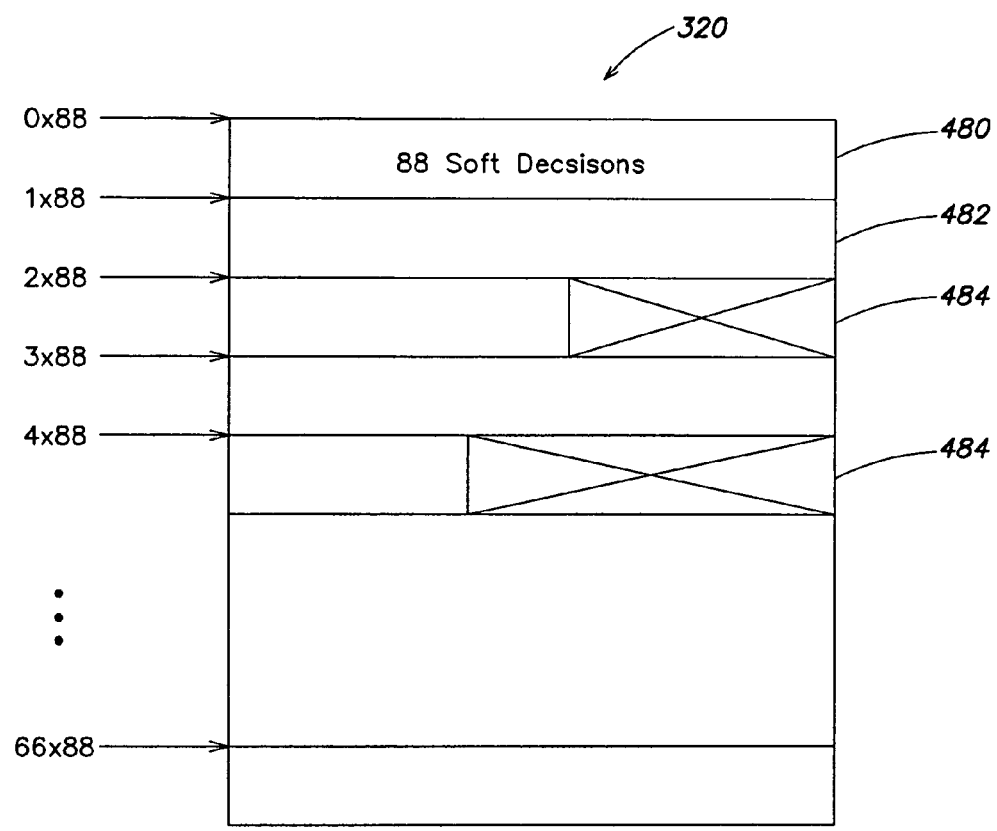
FIG. 7A is a schematic diagram that illustrates the organization of the frame buffer.

An example of an organization of frame buffer 320 is shown schematically in FIG. 7A. Blocks 480, 482, etc., each having a size of 88 bytes for holding 88 soft decisions are allocated. Thus, new physical channels begin on 88 byte boundaries in the frame buffer 320. In the example of FIG. 7A, frame buffer 320 supports up to 66 physical channels. Areas 484 make contain dummy data when the corresponding physical channel contains less than 88 bytes.

Physical Channel De-Mapping Engine

Physical channel de-mapping is performed for every coded composite transport channel (CCTrCH) in a radio frame. In one embodiment, there can be up to four coded composite transport channels in every 10 ms radio frame. The physical channel de-mapping engine reads soft decisions which have been sent from the joint detector post processing module to the frame buffer 320. The de-mapped soft decisions are output to the intermediate frame buffer 322.

Figure 8:
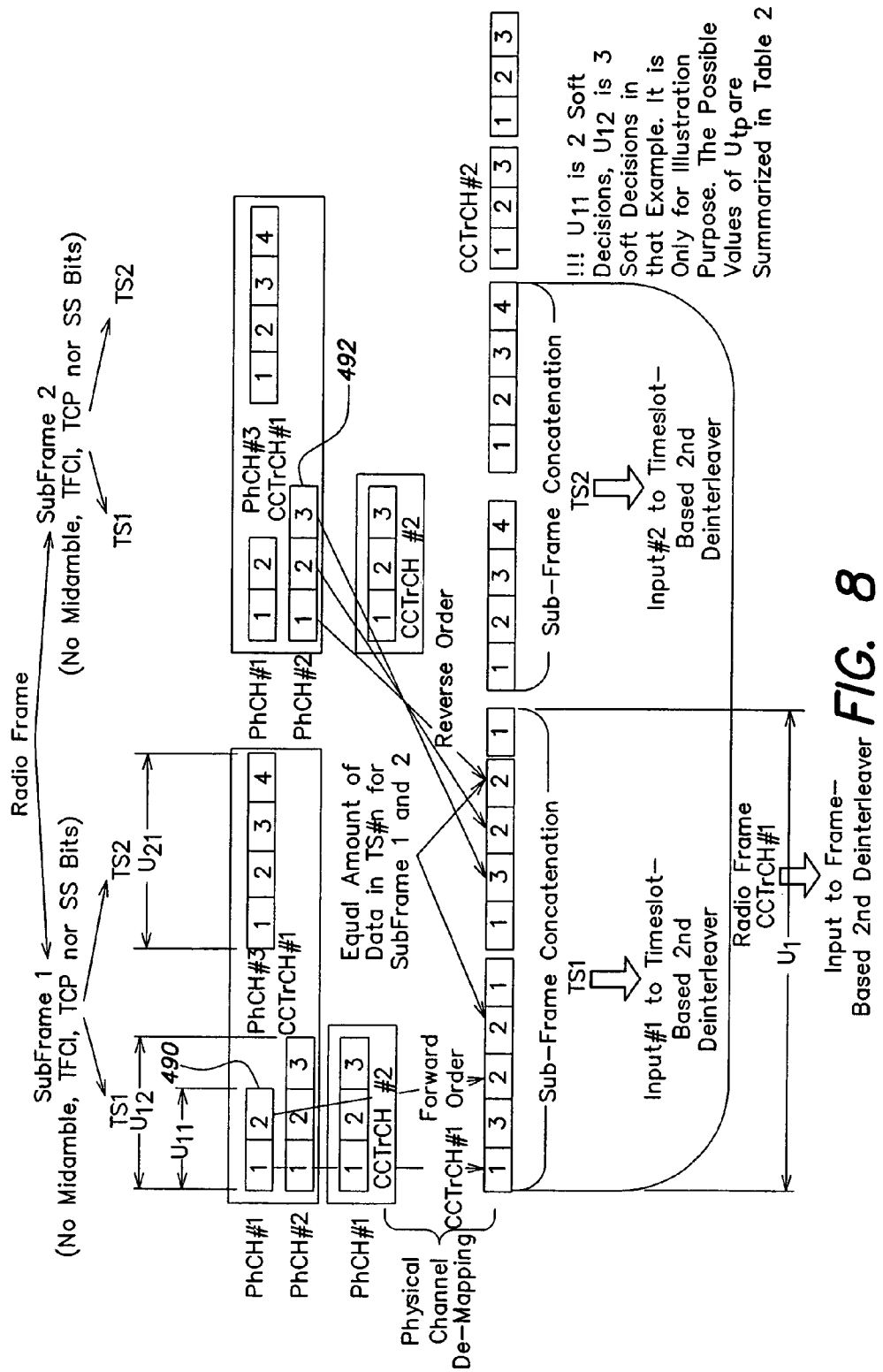
FIG. 8 is a schematic diagram that illustrates operations performed by the physical channel de-mapping engine.

The physical channel de-mapping operation is illustrated schematically in FIG. 8. A rule for physical channel de-mapping is that a physical channel contains one and only one coded composite transport channel. Odd-numbered physical channels 490 are filled in a forward order, and even-numbered physical channels 492 are filled in a reverse order. In one embodiment, the physical channel de-mapping removes unuseful data (physical channels which are determined not to be directed to the user equipment after decoding the TFCI) and pads with zeros the physical channels which have been discarded by the joint detector but which belong to the user equipment. The quantity $U_{tp}$ shown in FIG. 8 represents the number of soft decisions in time slot t and physical channel p (excluding control bits). The number of possible values for $U_{tp}$ depends on the time slot format utilized. In the TDSCDMA protocol, spreading factors of 1 and 16 may be utilized. For a spreading factor of 16, the maximum value of $U_{tp}$ is 88, and for a spreading factor of 1 the maximum value of $U_{tp}$ is 1408 (88×16).

The parameters for physical channel de-mapping include: (1) for each time slot and each channelization code, the start address of the input soft decisions; (2) for each coded composite transport channel and each time slot, the number of channelization codes and a list of the channelization codes; and (3) for each time slot t and physical channel p, the value of $U_{tp}$, the number of soft decisions.

Figure 9:
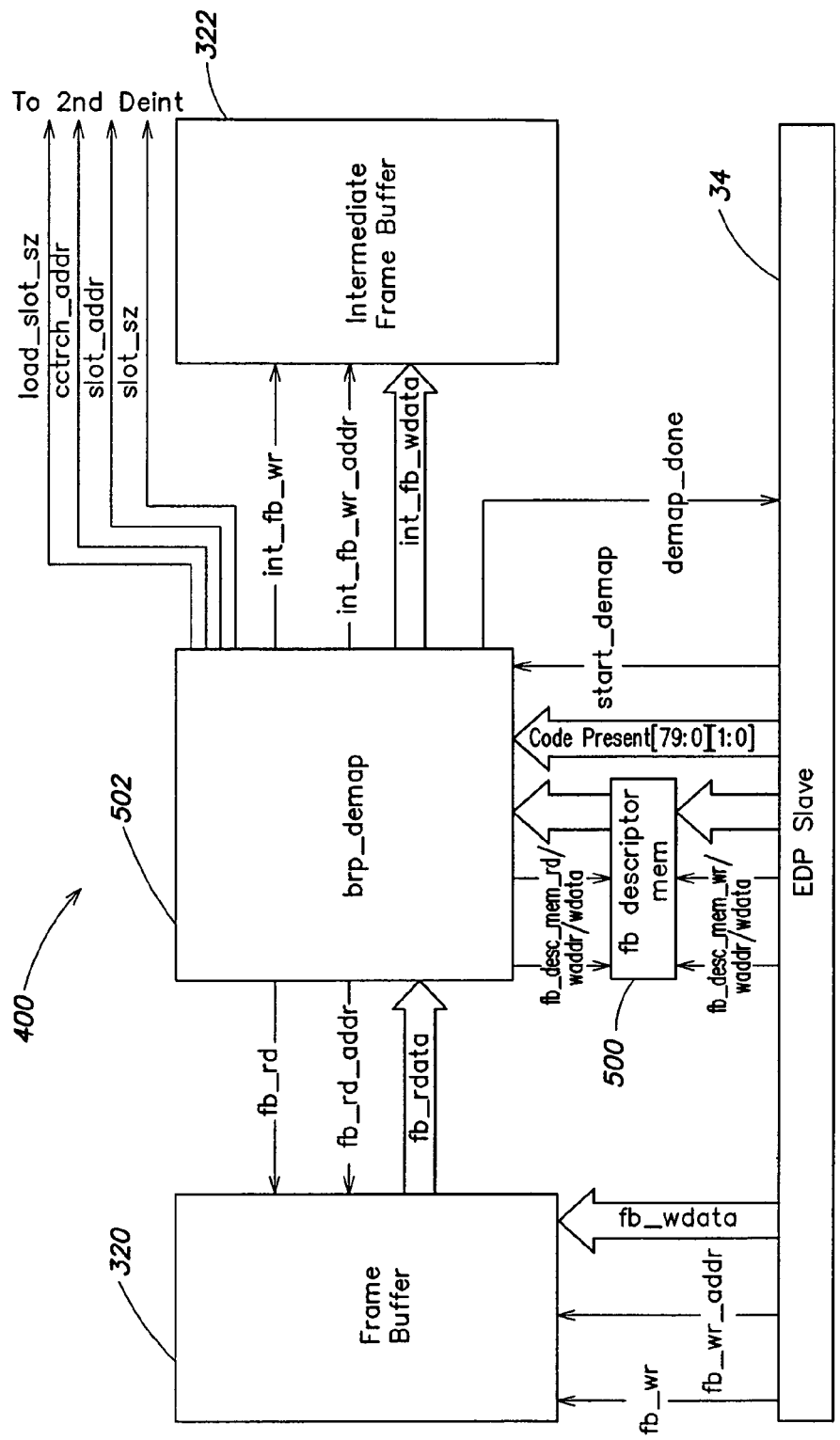
FIG. 9 is a block diagram of the physical channel de-mapping engine.
Figure 10:
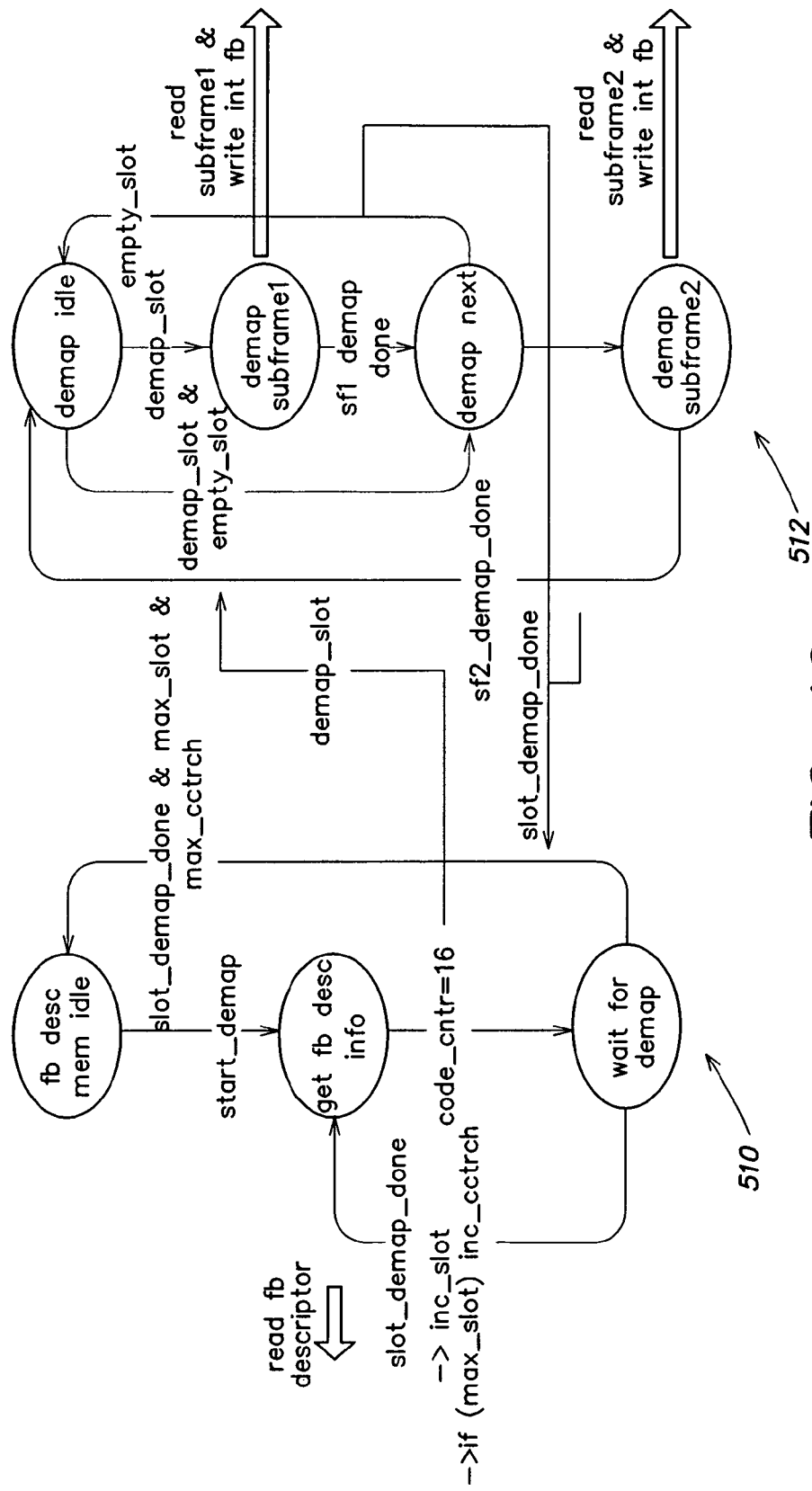
FIG. 10 is a state machine diagram of the physical channel de-mapping engine.

A block diagram of physical channel de-mapping engine 400 is shown in FIG. 9. As shown in FIG. 9, de-mapping engine 400 includes a frame buffer descriptor memory 500 and a de-map block 502. A state machine diagram of de-mapping engine 400 is shown in FIG. 10. The de-mapping engine 400 has two main functional components. A frame buffer descriptor read state machine 510 controls reads of a frame buffer descriptor memory 500 and configures the physical channel information for each CCTrCH in every time slot. The state machine 510 cycles through each CCTrCH across all time slots. In this way, soft decisions are written into the intermediate frame buffer 322 in subsequent buffer locations. In the process of reading the descriptor memory 500, the state machine 510 also generates size information per slot and per CCTrCH that is passed to the second de-interleaver 410 to generate de-interleaving matrix information.

A de-map state machine 512 uses the physical channel information generated by frame buffer descriptor read state machine 510 and performs the de-mapping operation. It cycles through each physical channel, incrementing or decrementing frame buffer pointers depending on the channel number. The de-map state machine 512 de-maps subframe 1 followed by subframe 2 and thus also achieves subframe desegmentation.

Intermediate Frame Buffer

The intermediate frame buffer 322 receives de-mapped physical channel data from de-mapping engine 400. The intermediate frame buffer 322 may have the same size as frame buffer 320. As noted above, by placing the intermediate frame buffer 322 after de-mapping engine 400, the frame buffer 320 can be emptied very early in the bit rate processing operation.

Second De-Interleaver

Figure 11:
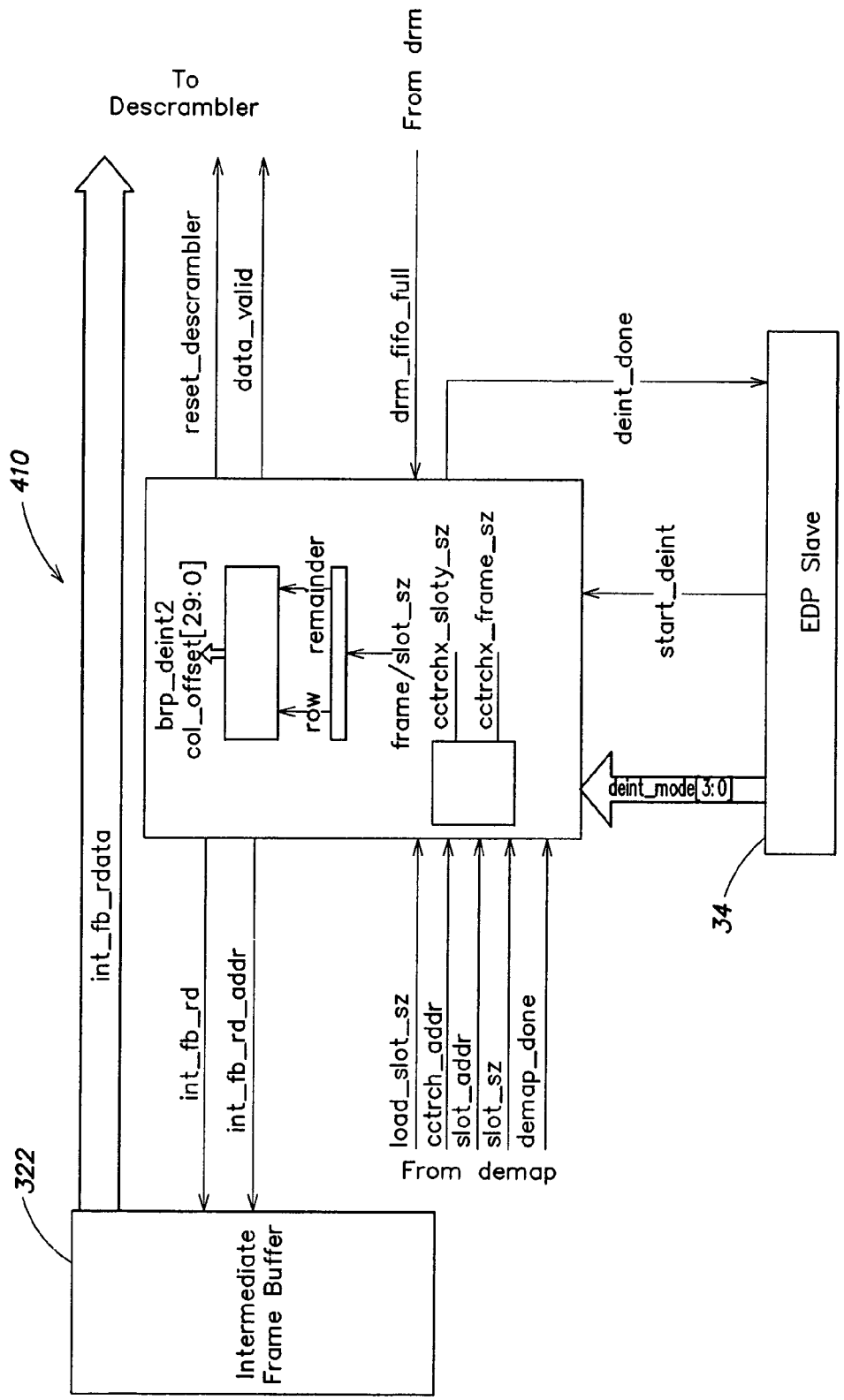
FIG. 11 is a block diagram of the second de-interleaver.
Figure 12:
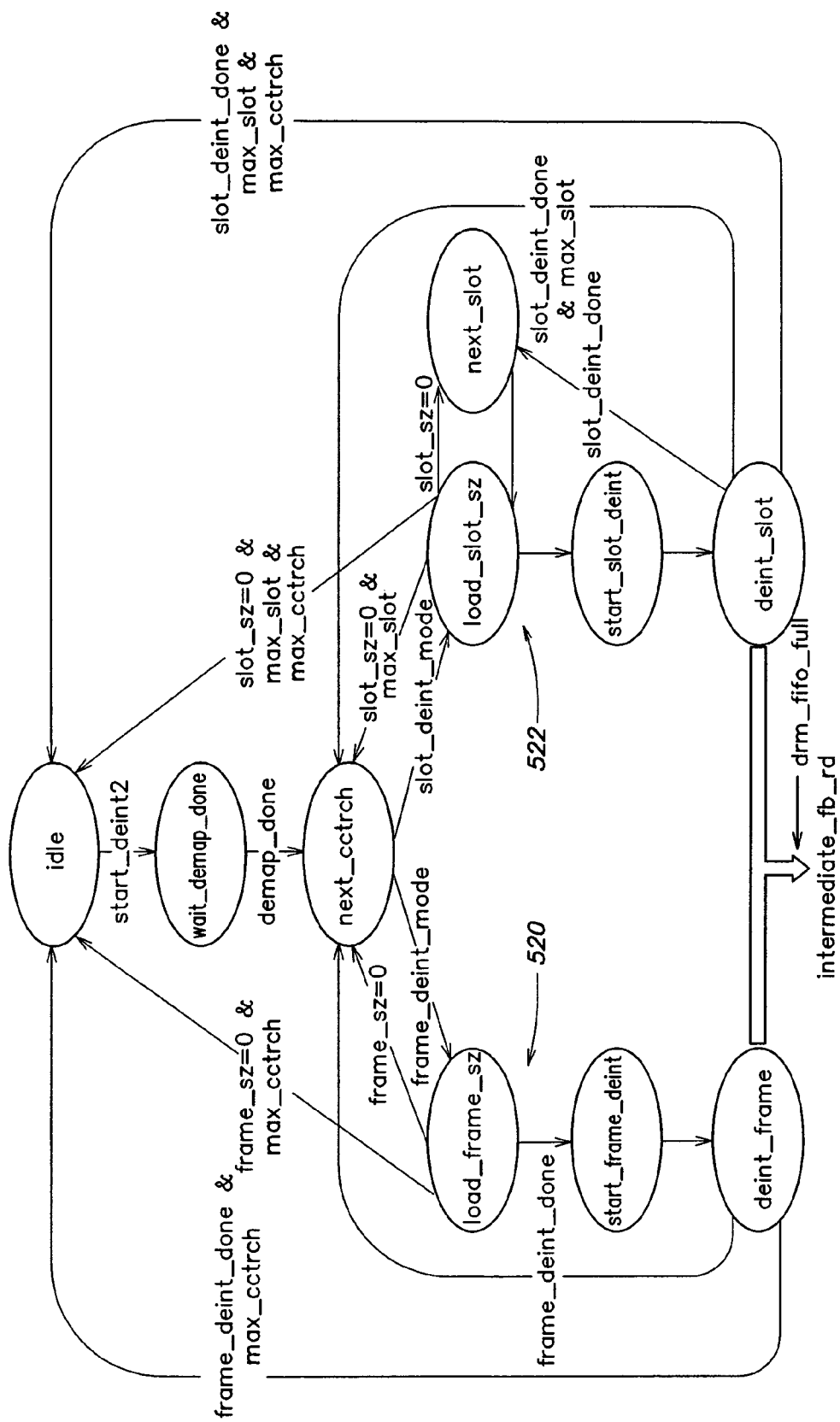
FIG. 12 is a state machine diagram of the second de-interleaver.

A block diagram of second de-interleaver 410 is shown in FIG. 11. A state machine diagram of second de-interleaver 410 is shown in FIG. 12. The second de-interleaver 410 is configured to perform frame-based de-interleaving 520 or slot-based de-interleaving 522, as instructed by DSP 24. In each case, the second de-interleaver 410 operates on a single CCTrCH at a time.

The frame-based second de-interleaving 520 is performed for every CCTrCH in a radio frame. In the current embodiment, there can be up to four CCTrCHs in each 10 ms radio frame. The frame-based de-interleaver reads soft decisions from the intermediate frame buffer 322, and inputs the de-interleaved soft decisions to the physical channel concatenation. The de-interleaving formula, as set forth in the TDSCDMA specification, generally involves writing the input bit sequence into a matrix, performing intercolumn permutation of the matrix, and reading a bit sequence out of the matrix after permutation.

The slot-based de-interleaving 522 is performed for every CCTrCH in a radio frame per time slot, where a time slot is over the two subframes of the radio frame. The slot-based de-interleaver is executed the maximum number of time slots times the maximum number of CCTrCHs every 10 ms radio frame. The slot-based de-interleaver reads soft decisions from the intermediate frame buffer 322 and inputs the de-interleaved soft decisions to the physical channel concatenation. The slot-based de-interleaver formula is similar to the frame-based de-interleaver formula, but is executed more times per radio frame.

De-interleaver parameters include: (1) de-interleaver mode (frame-based or slot-based); (2) for the slot-based de-interleaver, the number of soft decisions in time slot t on physical channels belonging to CCTrCH n; (3) for the frame-based de-interleaver, the number of soft decisions belonging to CCTrCH n in the current radio frame; and (4) the start address of the de-mapped buffer for CCTrCH n.

The second de-interleaver 410 has two main computational blocks and one state machine to control the de-interleaver logic. Slot size and frame size generation logic includes a simple adder logic to generate frame size information using slot size information from the de-mapping engine 400. Slot size information from the de-mapping engine 400 is used for slot-based de-interleaving. Matrix information logic involves the generation of row, remainder and column offset information based on the de-interleaving size.

Physical channel concatenation is performed for every CCTrCH in a radio frame. In the encoding chain, the physical channel segmentation separates the input bit sequence into time slots for the slot-based second interleaver. The inverse process, the physical channel concatenation, simply consists of writing the slot-based de-interleaved data so that the time slots appear consecutively in ascending order with respect to the time slot number. In practice, the slot-based de-interleaver can process each time slot starting from the first, then the second, etc. and write the outputs of each time slot consecutively. This process achieves physical channel concatenation.

Descrambler

Figure 13:
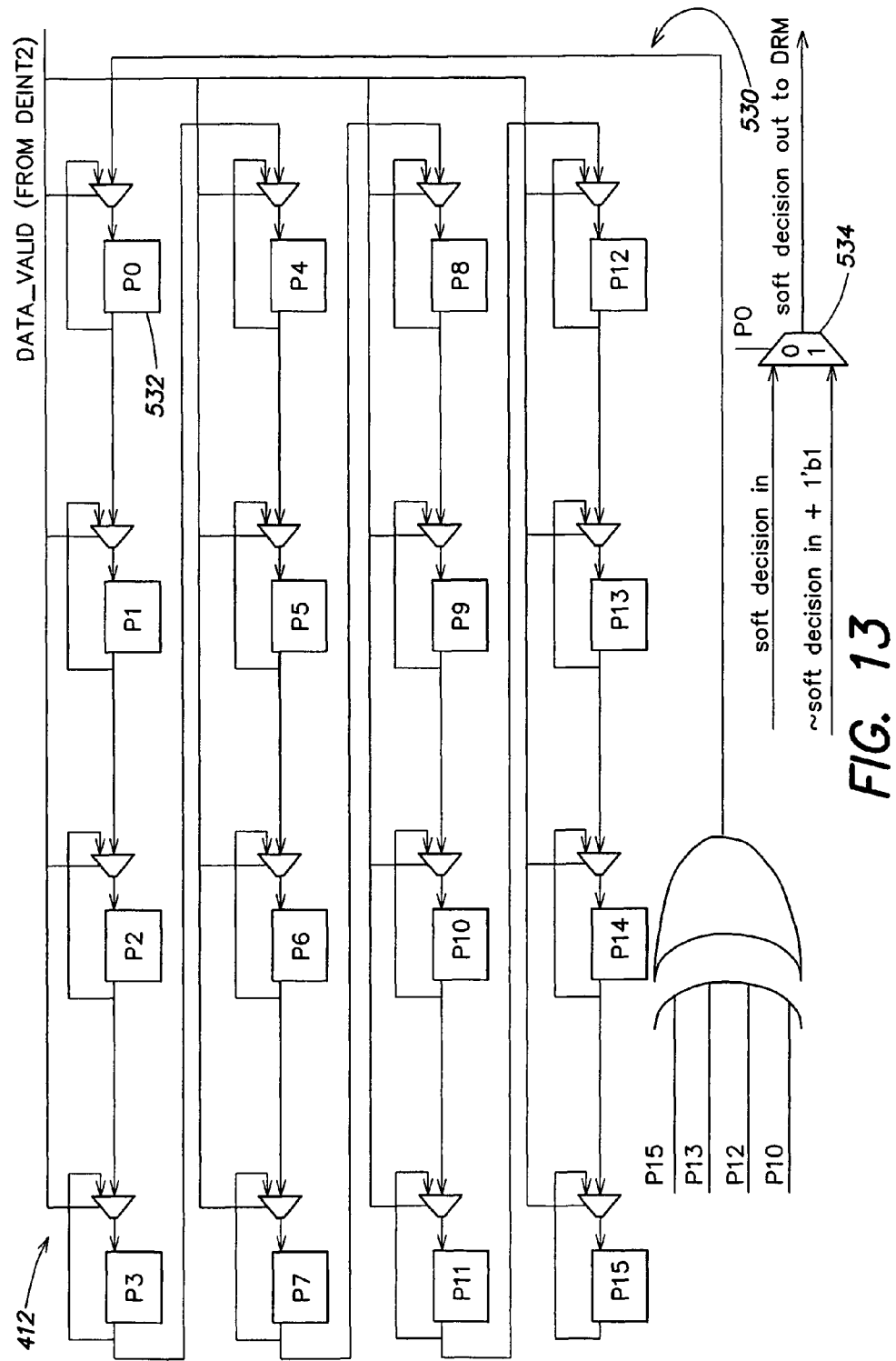
FIG. 13 is a block diagram of the descrambler.
Figure 14:
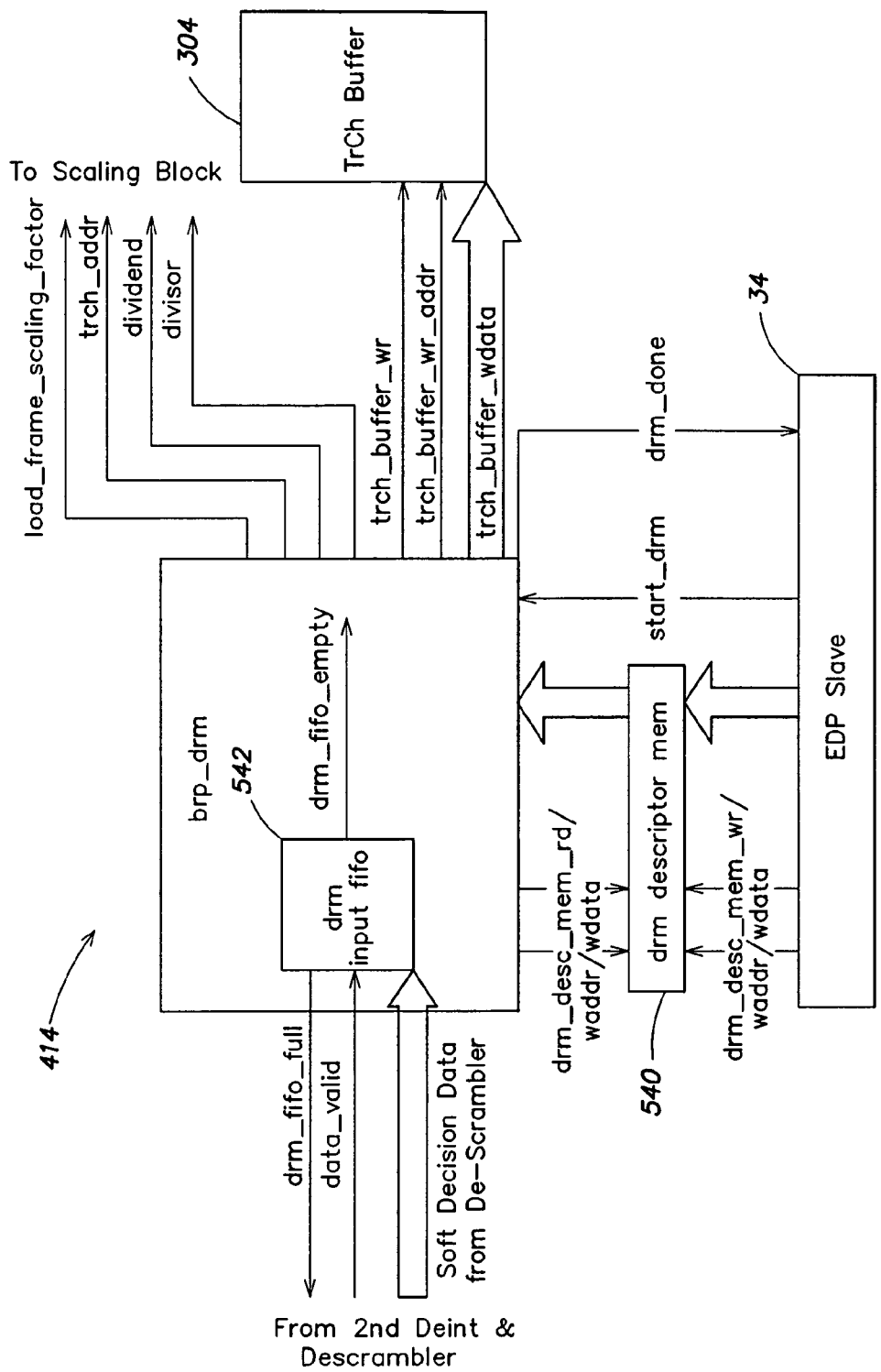
FIG. 14 is a block diagram of the de-rate matching engine.

A block diagram of descrambler 412 is shown in FIG. 13. Bit descrambling in descrambler 412 is performed for every CCTrCH in a radio frame. The process of scrambling bit j includes performing an exclusive OR with a polynomial element p[j] equal to 1 or 0. The bit is unchanged if p[j] is 0 and is negated if p[j] is 1. The bit descrambling process is applied to soft decisions. The soft decision descrambler is a 16-bit polynomial implementation with a feedback loop. As shown in FIG. 13, descrambler 412 may be implemented as a 16-stage linear feedback shift register 530. The zero degree coefficient output by first stage 532 is applied to a data selector 534 used to determine if the soft decision is to be negated. Negation is a two's complement negation. The register is reset to 0x0001 at the start of a new CCTrCH every frame. The polynomial content is the same for all CCTrCHs of a particular length.

CCTrCH Demultiplexing

CCTrCH demultiplexing is performed for every CCTrCH in a radio frame. For a given CCTrCH, after the second de-interleaver for a radio frame, $V_1$ consecutive data belong to transport channel no. 1, $V_2$ consecutive data belong to transport channel no. 2, etc. In practice, CCTrCH demultiplexing is a convention between the descrambler 412 and the de-rate matching engine 414. The demultiplexing itself is implicit.

De-Rate Matching

Rate matching at the transmitter involves puncturing or repetition of bits so that the bit rate after rate matching exactly matches channel capacity. The inverse rate matching is performed in the downlink receiver, so that the bit rate after de-rate matching matches the input rate to the channel decoder. Inverse rate matching includes the following operations: (1) zero insertion in place of punctured bits; and (2) maximum likelihood combining of repeated bits. The implementation of rate matching involves two steps. The first is rate matching parameter calculation. Rate matching parameters are calculated after decoding the TFCI. The TFCI contains information about the number of transport channels and the data rate of each transport channel active during that radio frame. The transport channel parameters are used to calculate rate matching parameters. The second step is implementation of the rate matching algorithm. The rate matching algorithm is reasonably straightforward, after the rate matching parameters are determined. De-rate matching is performed on a frame-by-frame basis. If a transport channel spans multiple radio frames, the part of the transport channel belonging to each frame can have different rate matching parameters.

Figure 15:
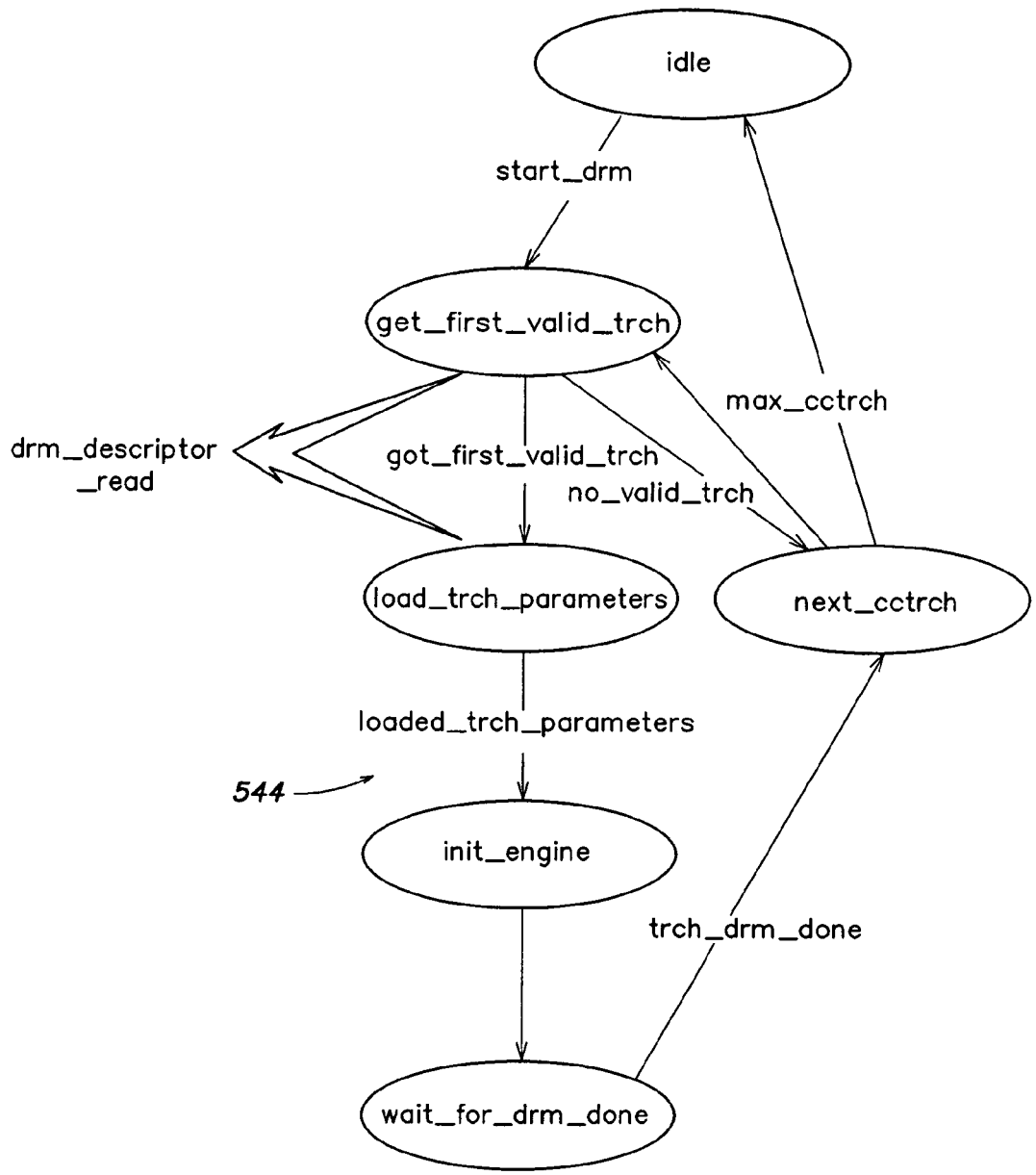
FIG. 15 is a state machine diagram of the de-rate descriptor manager.
Figure 16:
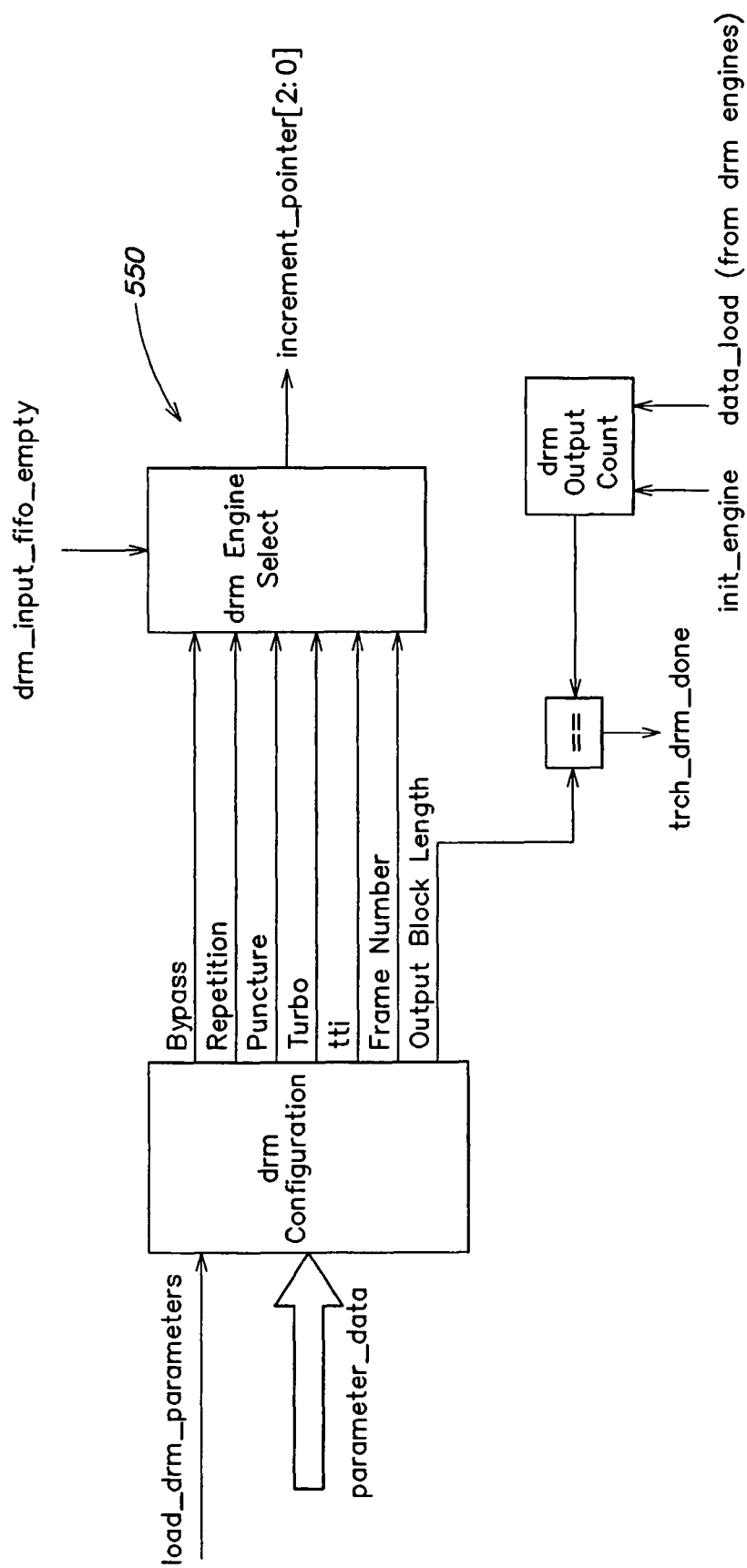
FIG. 16 is a block diagram of the de-rate matching select logic.
Figure 17:
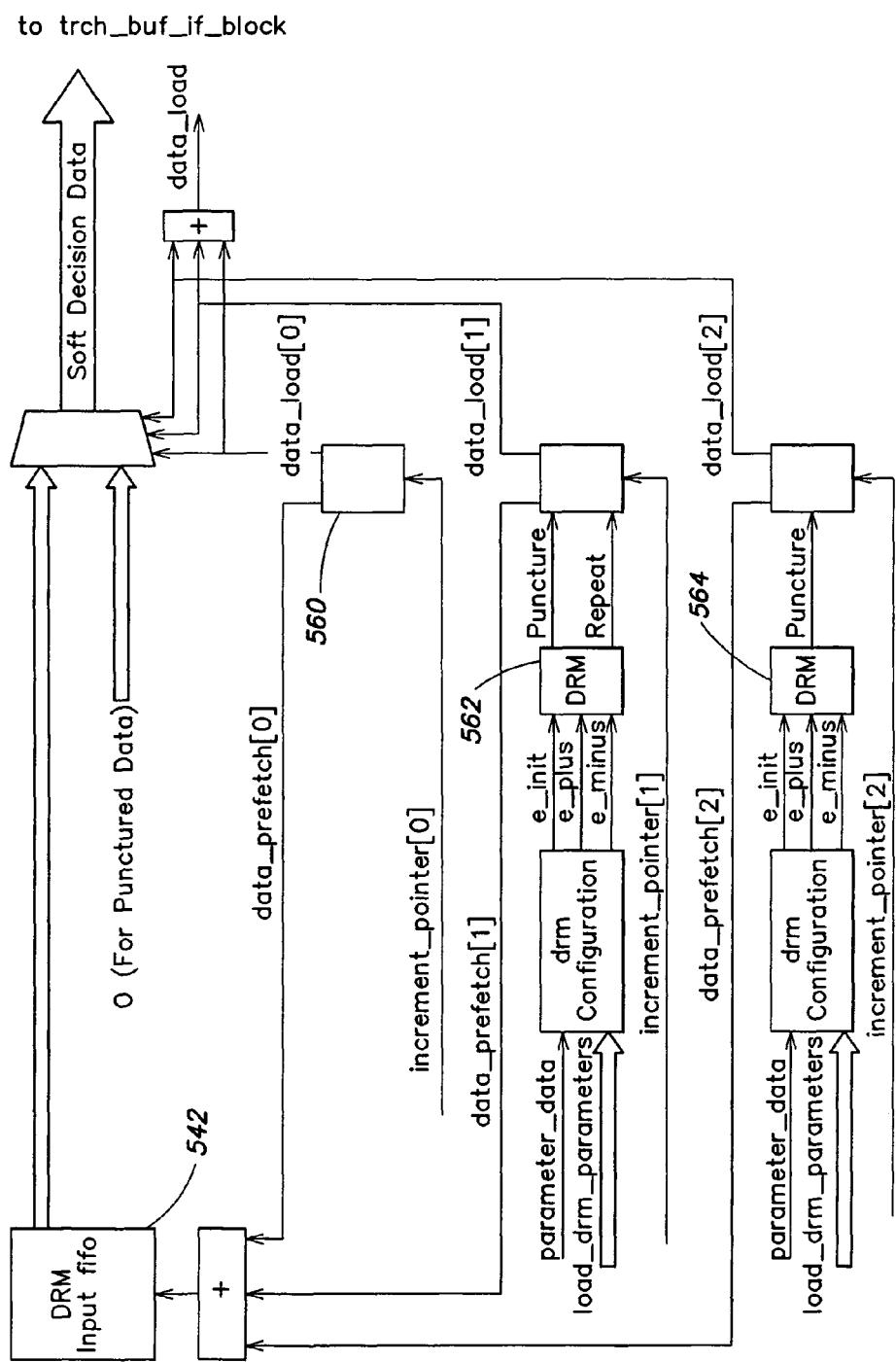
FIG. 17 is a block diagram of the de-rate matching engine.
Figure 18:
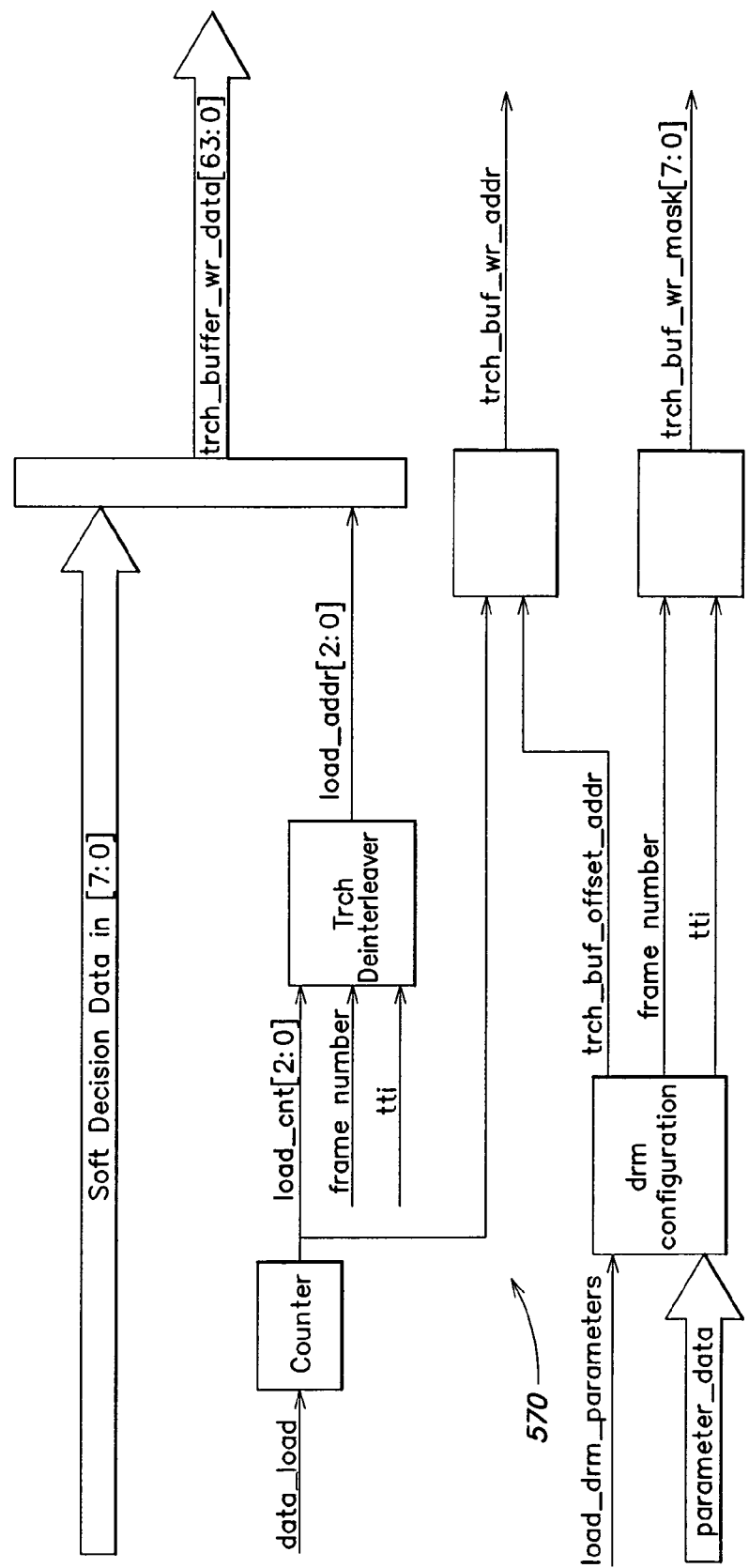
FIG. 18 is a block diagram of the de-rate matching transport channel buffer write logic.

The de-rate matching engine 414, shown in FIGS. 14-19, includes de-rate descriptor manager logic that reads a descriptor memory 540 (FIG. 14) and configures the de-rate matching engines. A state machine diagram of the descriptor manager logic is shown in FIG. 15. A state machine 544 controls operation of descriptor memory 540. The de-rate matching engine 414 further includes select logic 550 (FIG. 16) that selects between three de-rate matching engines (FIG. 17), including: (1) bypass 560 for non-rate matched and systematic bits of turbo encoded data with puncturing; (2) engine 562 used for transport channel with repetition or puncturing; and (3) engine 564 used only for the second parity stream in the case of turbo encoded data with puncturing. An input FIFO 542 (FIG. 14) controls data flow coming from the second de-interleaver/descrambler. A transport channel buffer interface 570 (FIG. 18) gathers bytes from the de-rate matching engine and writes up to 8 bytes at a time into the transport channel buffer 304. The transport channel buffer interface 570 also performs transport channel de-interleaving. A frame scaling factor estimation block 580 (FIG. 19), in this embodiment, sums the magnitude of all soft decisions and the total count of soft decisions per transport channel and passes the information to the scaling block in the back end processor 302. This information is needed for scaling factor estimation for the complete transport time interval.

Transport Channel De-Interleaver

Transport channel de-interleaving is block de-interleaving with intercolumn permutation. The operation of the first de-interleaver 416, or transport channel de-interleaver, involves writing data values into a matrix row wise, reordering columns of the matrix using a predefined permutation pattern and then reading data values column by column, starting with the first column.

Transport Channel Buffer

The transport channel buffer 304 is used for holding up to a transport time interval (TTI) of soft decisions of all active transport channels. Since the maximum TTI duration is 80 ms, the transport channel buffer 304 may hold up to 8 frames of soft decisions in some cases. In one embodiment, the memory organization of transport channel buffer 304 is under control of DSP 24. In other embodiments, the organization of transport channel buffer 304 may be implemented in hardware.

Figure 20A:
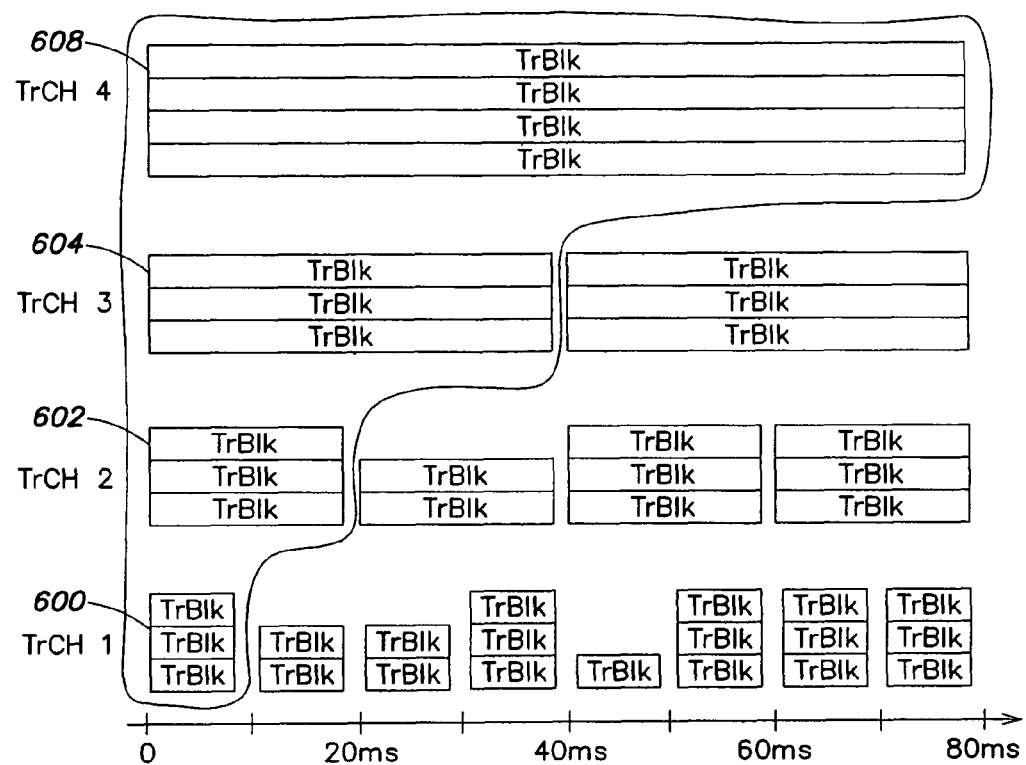
FIG. 20A is a timing diagram that illustrates transport channels with different transport time intervals multiplexed into a single coded composite transport channel.

The alignment of transport channels multiplexed into one CCTrCH is shown in FIG. 20A. Transport channels multiplexed into one CCTrCH have coordinated frame timing. As shown in FIG. 20A, a transport channel 600 has a TTI of 10 ms, a transport channel 602 has a TTI of 20 ms, a transport channel 604 has a TTI of 40 ms, and a transport channel 608 has a TTI of 80 ms. Transport channels 600, 602, 604 and 608 begin transmission at the same time.

Figure 20B:
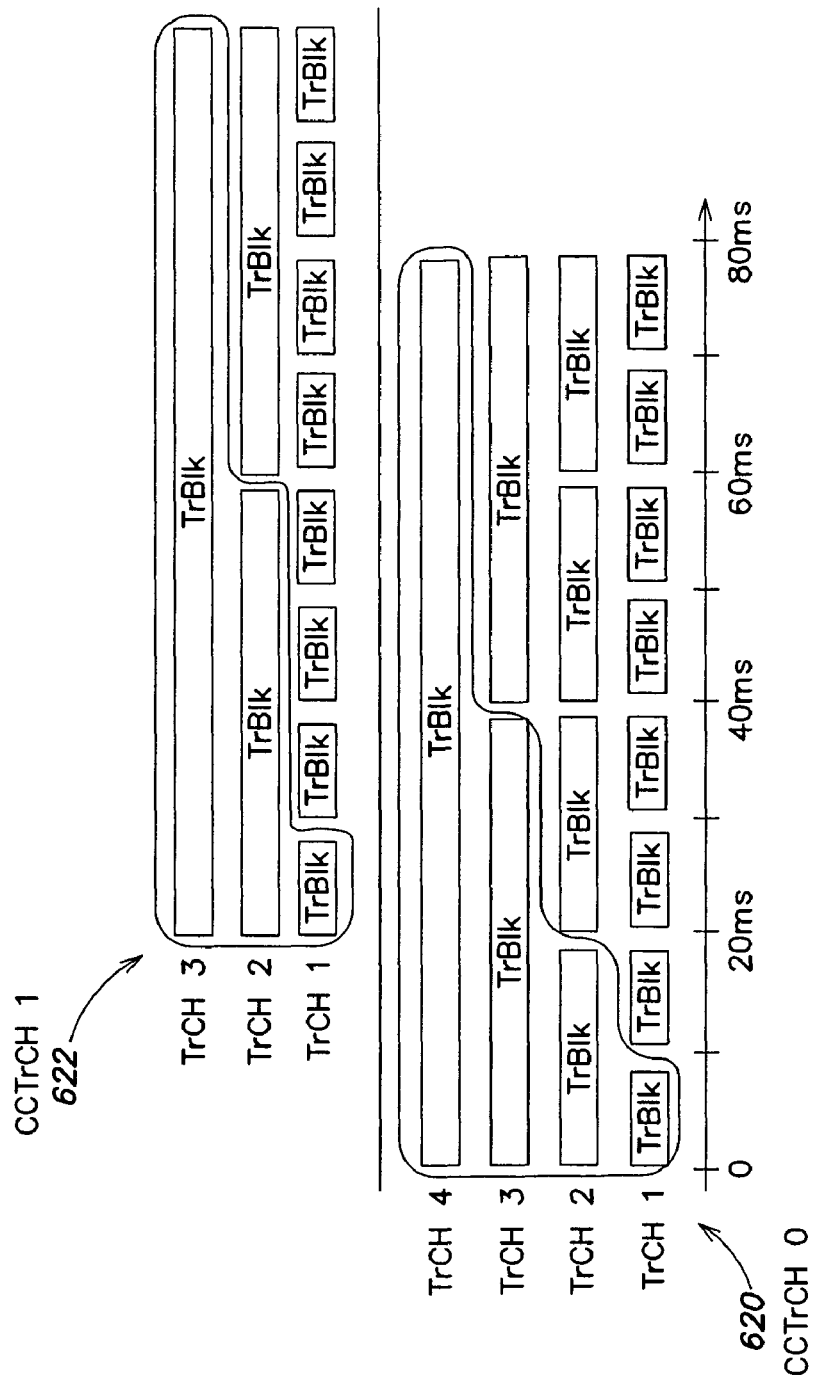
FIG. 20B is a timing diagram that illustrates two coded composite transport channels that are not aligned in time.
Figure 20C:
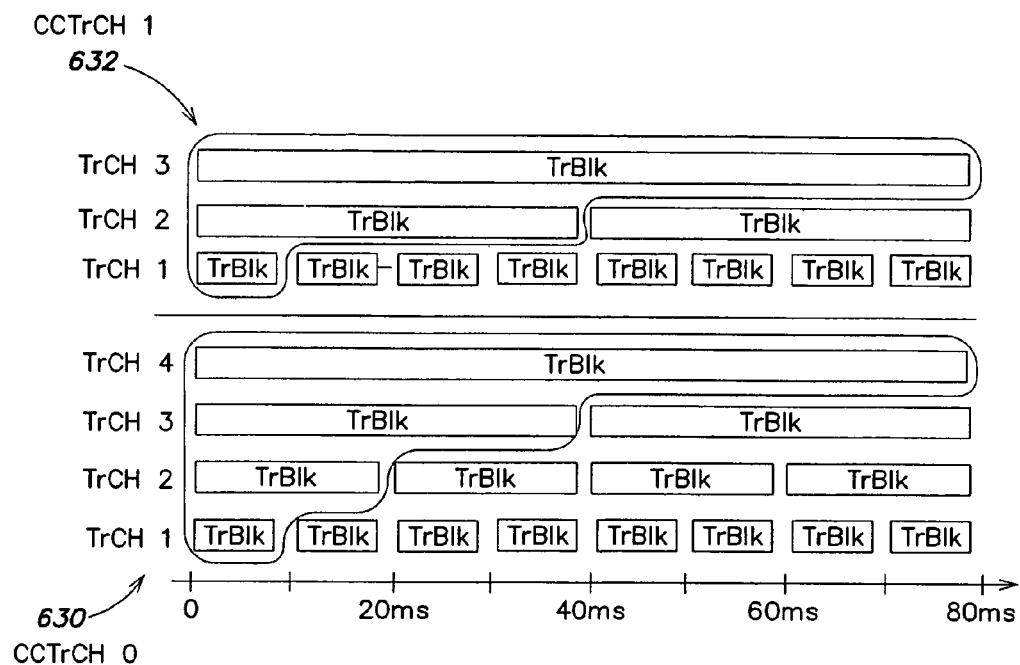
FIG. 20C is a timing diagram that illustrates two coded composite transport channels that are frame aligned.

In the case of multiple CCTrCHs, the frame start timing may or may not be aligned. FIG. 20B shows an example of two CCTrCHs where the start timing of CCTrCH 620 and CCTrCH 622 differ by 20 ms. FIG. 20C shows an example of two CCTrCHs where the start timing of CCTrCH 630 and CCTrCH 632 are the same.

Figure 21A:
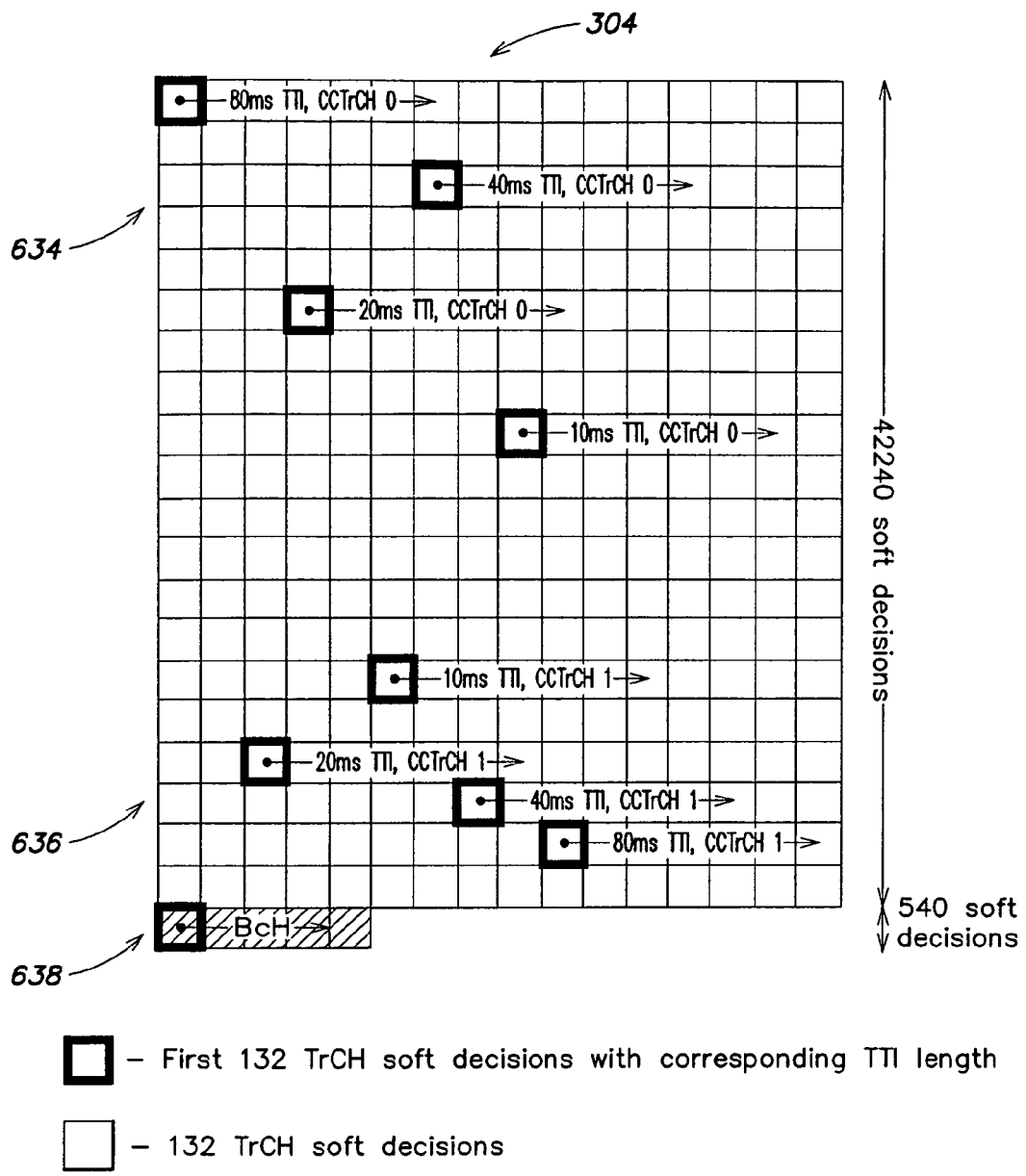
FIG. 21A is a schematic diagram that illustrates a first embodiment of transport channel buffer organization for use in WCDMA systems.
Figure 21B:
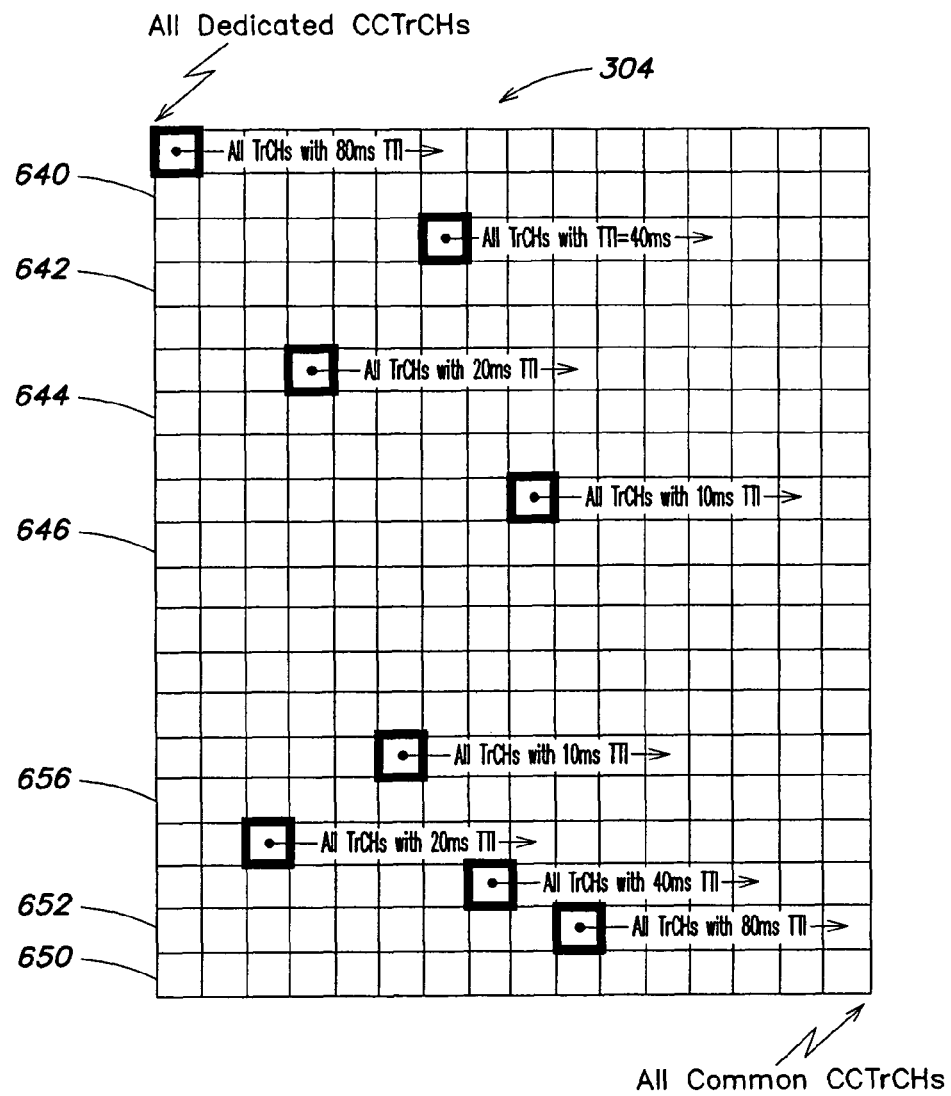
FIG. 21B is a schematic diagram that illustrates a second embodiment of transport channel buffer organization for use in TDSCDMA systems.

The transport channel buffer memory organization for a group of CCTrCHs having two distinct frame timings can be viewed as two software stacks progressing from the two ends of the buffer (top and bottom). All transport channels belonging to CCTrCHs having the first distinct frame timing are organized from one end (the top) starting with transport channels having the longest duration TTI. Transport blocks smaller TTIs are then stored sequentially, as shown in FIGS. 21A and 21B. For example, transport channels having 80 ms TTIs are stored first at the top of the buffer, transport channels having 40 ms TTIs are stored second, transport channels having 20 ms TTIs are stored third, and transport channels having 10 ms TTIs are stored last. All transport channels belonging to CCTrCHs having the second distinct frame timings are organized from the other end (the bottom) starting with the transport channel having the longest duration TTI. The transport channels having smaller TTIs are then stored sequentially in the backward direction toward the top of the buffer. All transport channels belonging to a third fixed length CCTrCH are placed either at the top or the bottom of the transport channel buffer.

In the case of TDSCDMA systems, all dedicated CCTrCHs have a common frame timing and all common CCTrCHs have a common frame timing, which may be different from the dedicated CCTrCHs. So all dedicated transport channels can be organized from the top of the transport channel buffer, and all common transport channels can be organized from the bottom of the transport channel, as shown in FIG. 21B.

In the case of WCDMA systems, there are two variable length CCTrCHs. A first CCTrCH 634 may be organized from the top of the transport channel buffer and a second CCTrCH 636 may be organized from the bottom of the transport channel buffer, as shown in FIG. 21A. A third fixed length CCTrCH 638 is located in a fixed position, as shown in FIG. 21A. The fixed position may be at the top or the bottom of the transport channel buffer.

The transport channel buffer allocated for each transport channel is fixed for the duration of the TTI. For example, for a transport channel with 80 ms TTI, the buffer for eight frames is allocated during the first frame. The buffer allocated for this transport channel remains fixed for eight frames. After the TTI is completed, a new buffer size may be allocated depending on the transport channel size in the next TTI.

In the case of WCDMA systems, the TTI duration for a transport channel is a static parameter and remains fixed. For TDSCDMA systems, the TTI duration for a transport channel can change from frame to frame. The transport channel buffer 304 may be utilized for both cases.

An example is described with reference to FIGS. 20B and 21B. Transport channel 4 (80 ms TTI) of CCTrCH 620 in FIG. 20B may be allocated to area 640 at the top of transport channel buffer 304, transport channel 3 (40 ms TTI) of CCTrCH 620 may be allocated to area 642 of transport channel buffer 304, transport channel 2 (20 ms TTI) of CCTrCH 620 may be allocated to area 644 of transport channel buffer 304, and transport channel 1 (10 ms TTI) of CCTrCH 620 may be allocated to area 646 of transport channel buffer 304. Transport channel 3 of CCTrCH 622 in FIG. 20B may be allocated to area 650 in transport channel buffer 304, transport channel 2 of CCTrCH 622 may be allocated to area 652 in transport channel buffer 304, and transport channel 1 of CCTrCH 622 may be allocated to area 656 in transport channel buffer 304. In this example, CCTrCH 622 does not have a transport channel of TTI 20 ms, and area 656 immediately follows area 652.

In the foregoing example, CCTrCH 620 is allocated beginning at the top of transport channel buffer 304 and progressing toward the bottom of transport channel buffer 304. The second CCTrCH 622 is allocated at a second address at or near the bottom of the transport channel buffer 304 and progressing toward the top of transport channel buffer 304. Each buffer allocation is configured to store transport channels having the longest duration in TTI followed by transport channel data having successively shorter duration TTIs.

Transport Channel Buffer Manager

Figure 22A:
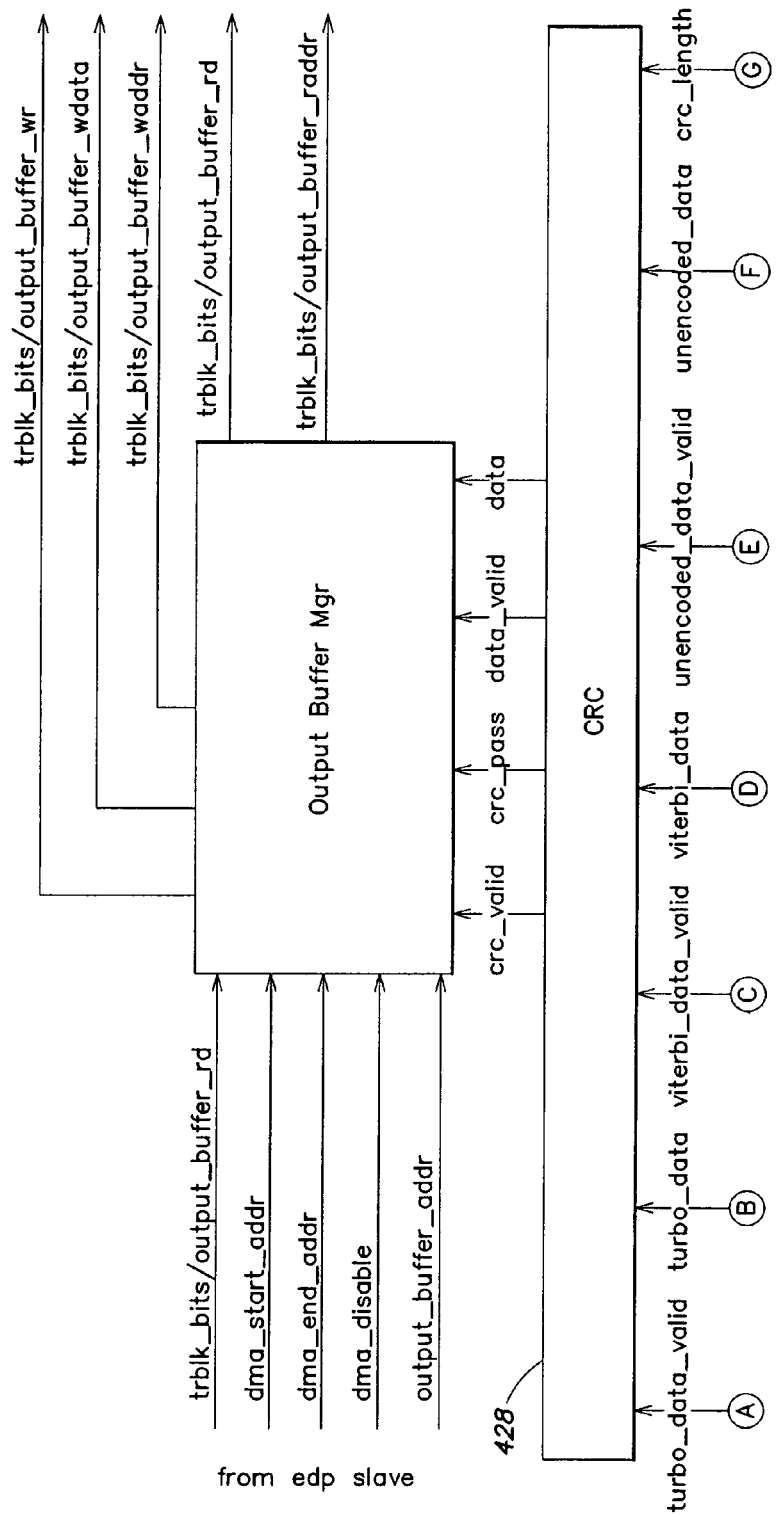
FIG. 22 is a block diagram of the back end processor.
Figure 22B:
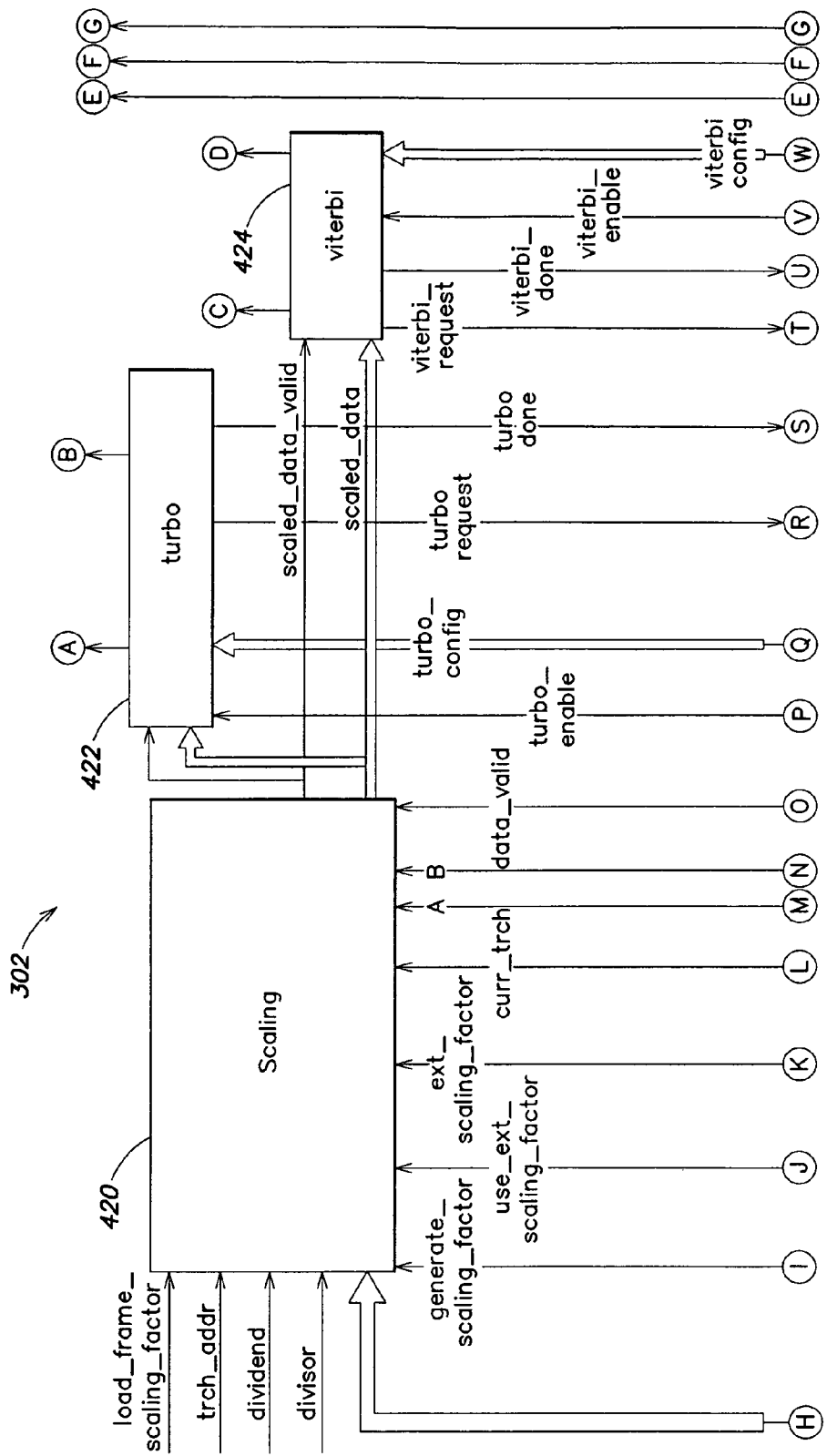
Figure 22C:
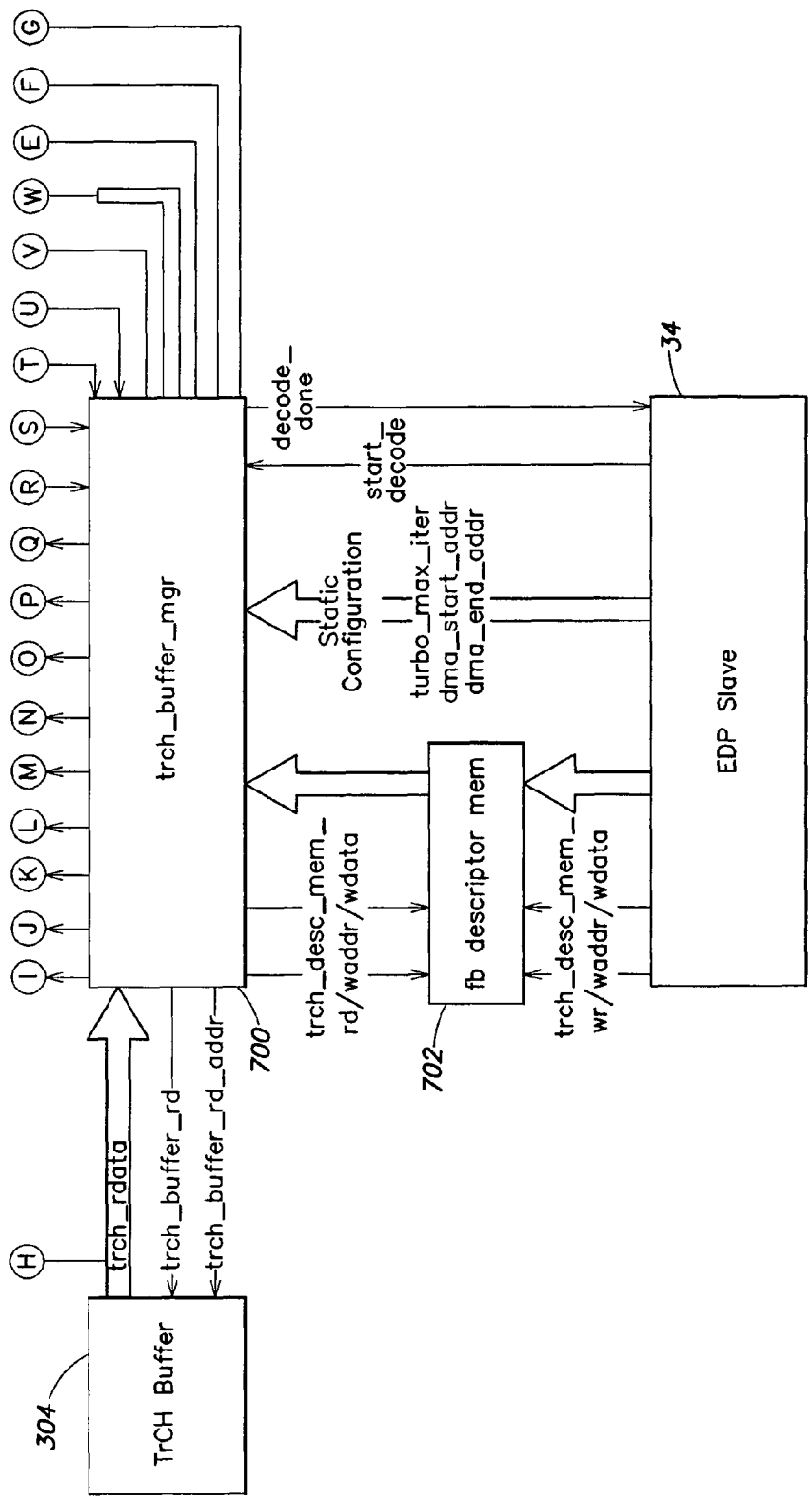
Figure 23:
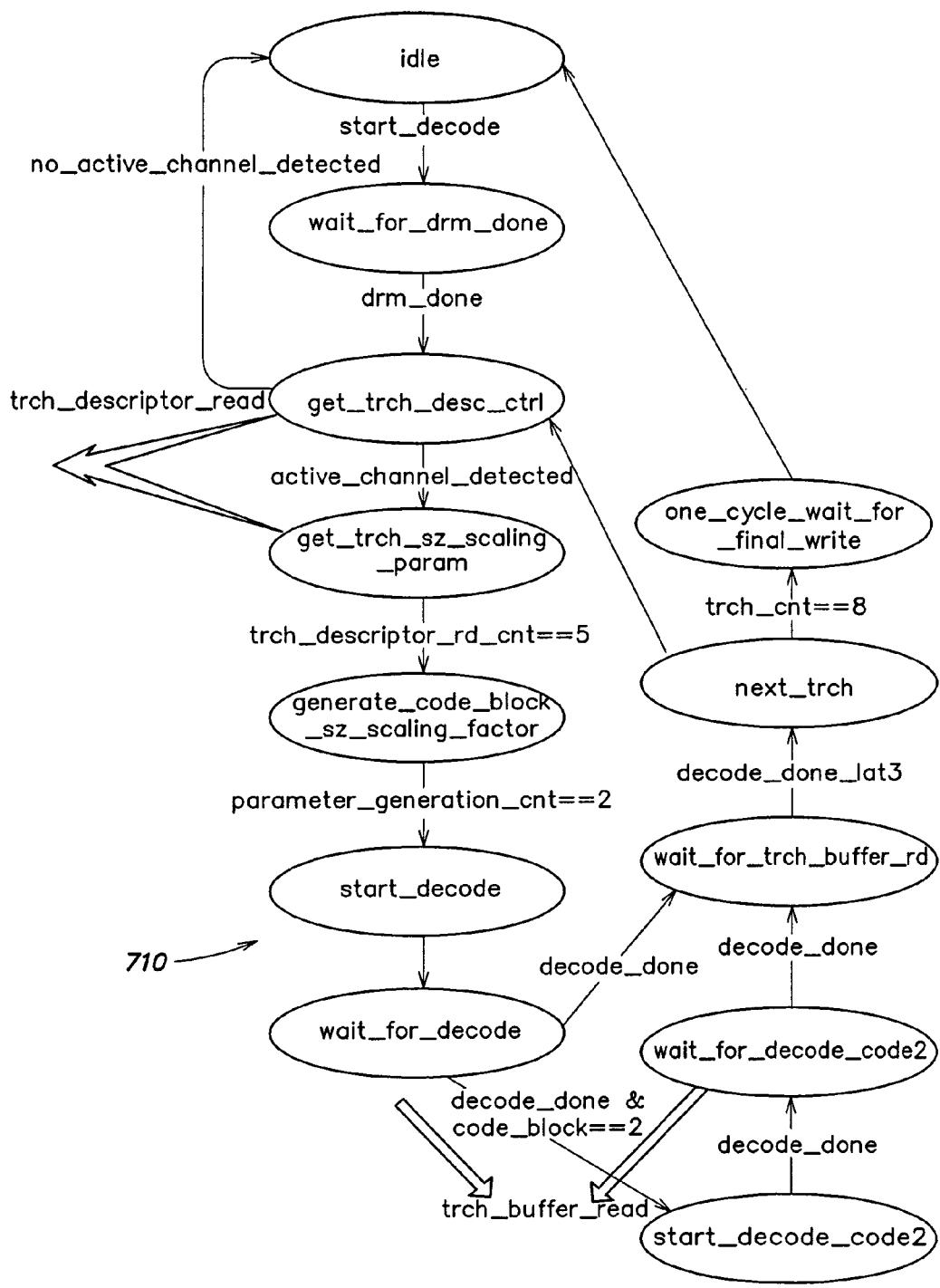
FIG. 23 is a state machine diagram of the transport channel buffer manager.

A block diagram of the back end processor 302 is shown in FIG. 22, with the exception that output buffer 324 is not shown. The transport channel buffer manager 700 controls the configuration of the back end blocks by reading a transport channel descriptor memory 702 and programming the turbo decoder 422, the viterbi coder 424, the scaling circuit 420 and the CRC checker 428. The transport channel buffer manager 700 also contains computational elements to calculate code block size and number of code blocks. The transport channel decoding proceeds in increasing order of transport channel number. The transport channel buffer manager operates according to a transport channel buffer manager state machine 710 shown in FIG. 23.

Scaling Circuit

Scaling in the bit rate processor involves quantizing the soft decisions to 4 bits at the input of the channel decoder. All bit rate processing excluding channel decoders uses 8 bit input and output data. The scaling algorithm quantizes the soft decisions so that the input to the channel decoder can be represented using 4 bits. The scaling algorithm is implemented by scaling circuit 420 in third stage 314 and by a scaling factor estimation block in de-rate matching engine 414 of second stage 312.

The channel decoders are the most computationally intense of elements in the bit rate processor. Thus, it is desirable to optimize the bit width of the channel decoder. Performance simulations show that both viterbi and turbo decoders perform well, even when soft decisions are quantized to 4 bits at the input.

The scaling operation includes two basic steps. The first is scaling factor estimation. The scaling factor is estimated based on the probability distribution of the signal amplitude or the effective value of the signal amplitude. In one embodiment, the scaling factor is a measure of the average amplitude of the soft decisions of the block. The scaling factor for each transport channel is determined on-the-fly as the de-rate matching engine 414 outputs rate-matched soft decisions and stores them in the transport channel buffer 304. The second operation is soft decision scaling. Scaling involves selecting the correct 4-bit field from the 8-bit soft decision in this embodiment.

The scaling factor can be estimated in a variety of ways. The soft decisions belonging to a code block should have the same scaling factor. Scaling factor estimation can have three levels of granularity as follows.

1. The scaling factor can be estimated on a code block basis. The scaling factor is estimated based on the average of the absolute values of all soft decisions in a code block. If a transport channel includes two code blocks, each code block can have its own scaling factor.

2. The scaling factor can be estimated on a transport channel basis. The scaling factor is estimated based on the average of the absolute values of the soft decisions in the transport channel. If the transport channel includes only one code block, then the scaling factor is the same as estimated on a code block basis. If the transport channel includes more than one code block, all code blocks have the same scaling factor.

3. The scaling factor is estimated on a CCTrCH basis. The scaling factor is estimated based on the average of the absolute values of the soft decisions belonging to a CCTrCH. All channels having the same TTI duration have the same scaling factor. For example, if there are 10 transport channels and all have a 10 ms TTI duration, all transport channels have the same scaling factor.

Figure 25:
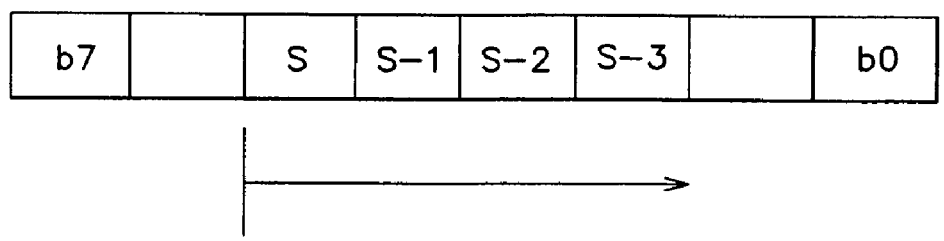
FIG. 25 is a schematic illustration of the scaling algorithm.

The scaling algorithm is illustrated schematically in FIG. 25. A soft decision is scaled according to scaling factor S by selecting four bits starting with bit position S.

Figure 19:
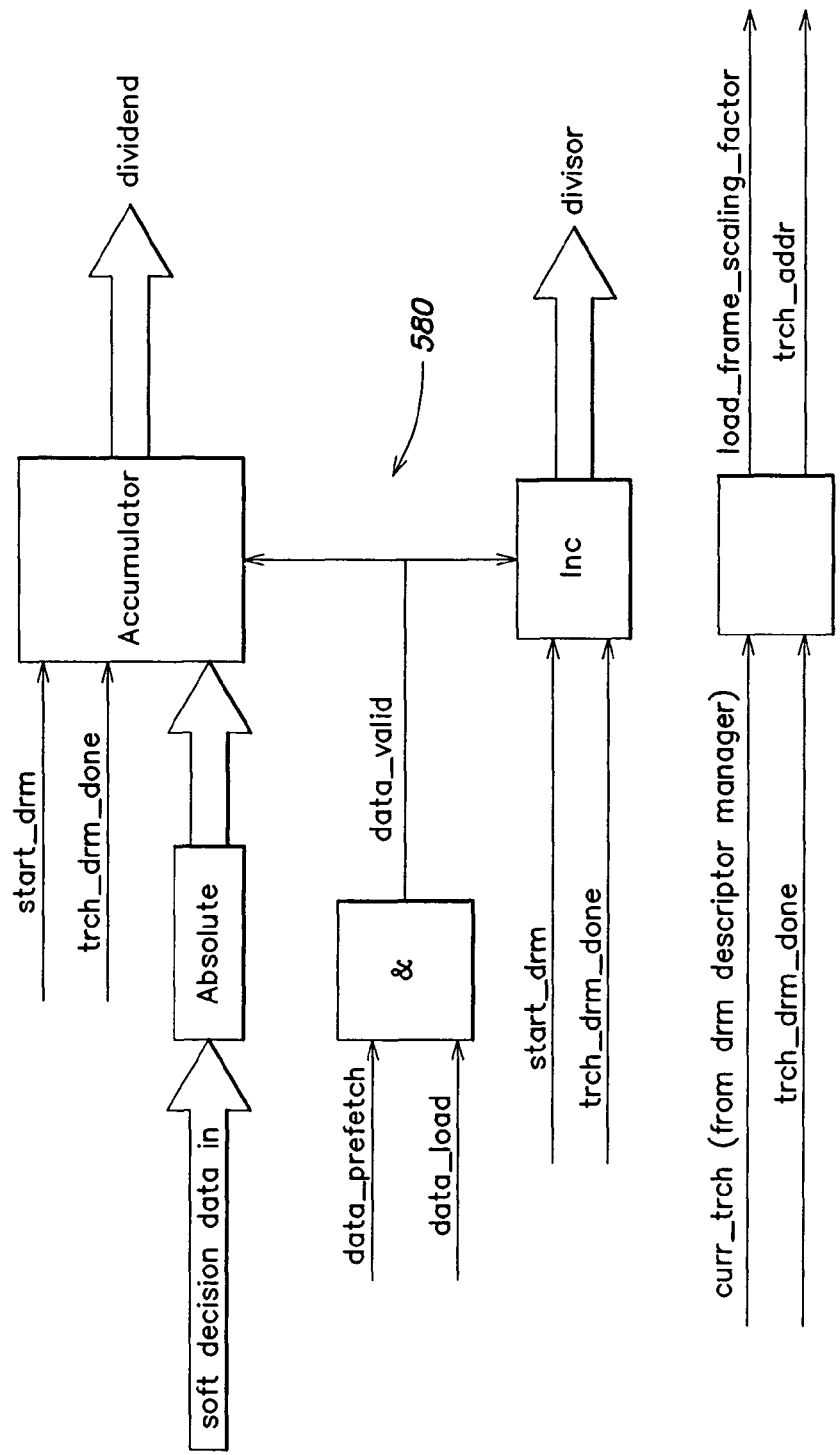
FIG. 19 is a block diagram of the scaling factor estimation circuit.
Figure 24:
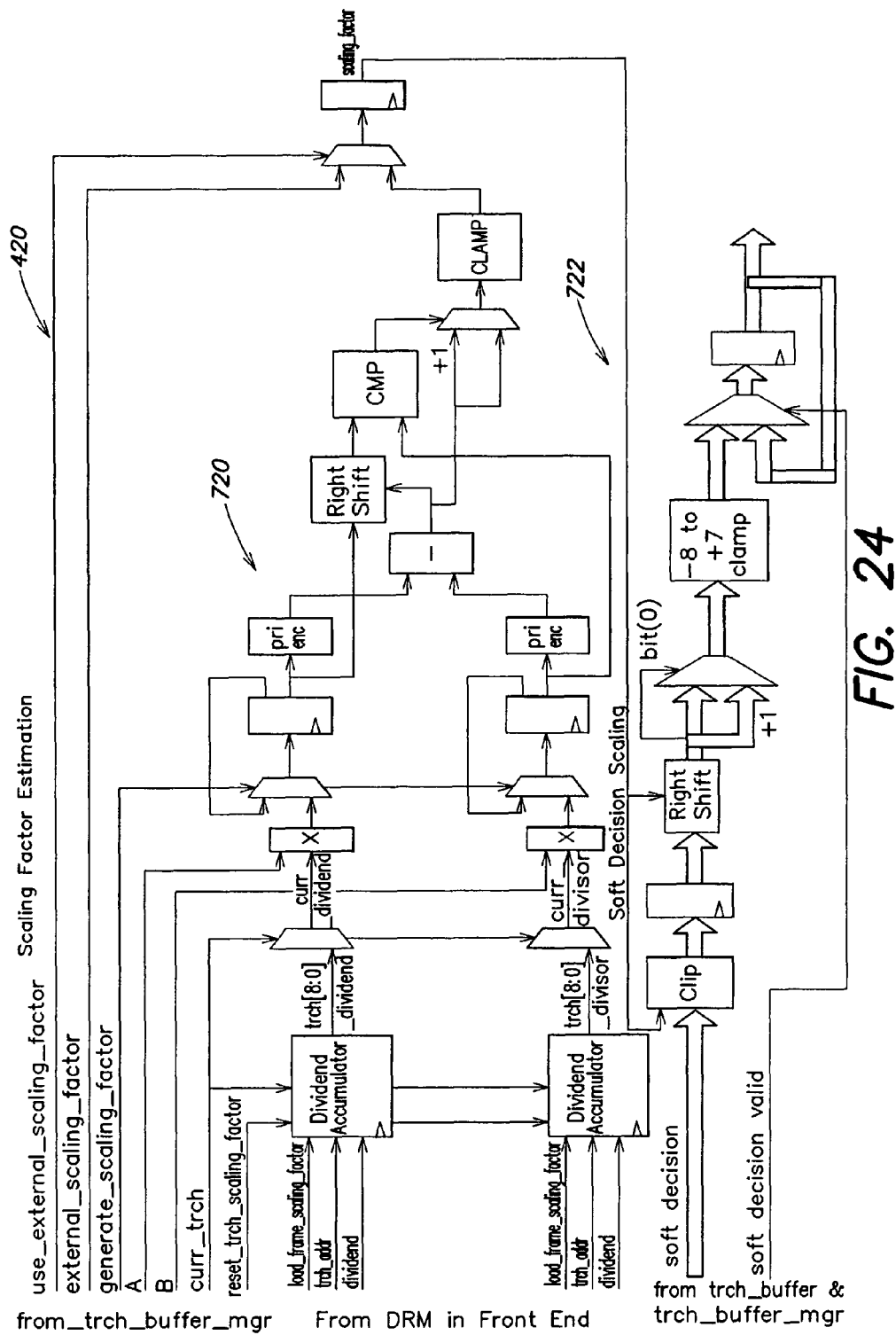
FIG. 24 is a block diagram of the scaling circuit.

The scaling circuit 420 is illustrated in FIG. 24. The scaling circuit 420 includes a scaling factor estimation circuit 720 that determines a scaling factor based on the values determined by the circuit shown in FIG. 19 and a soft decision scaling circuit 722 which applies the scaling factor to the soft decisions supplied to the decoders. The portion of the scaling factor estimation block located in de-rate matching engine 414 is illustrated in FIG. 19. In another embodiment, the scaling factor is supplied to the bit rate processor by the DSP 24.

Decoder

Figure 26:
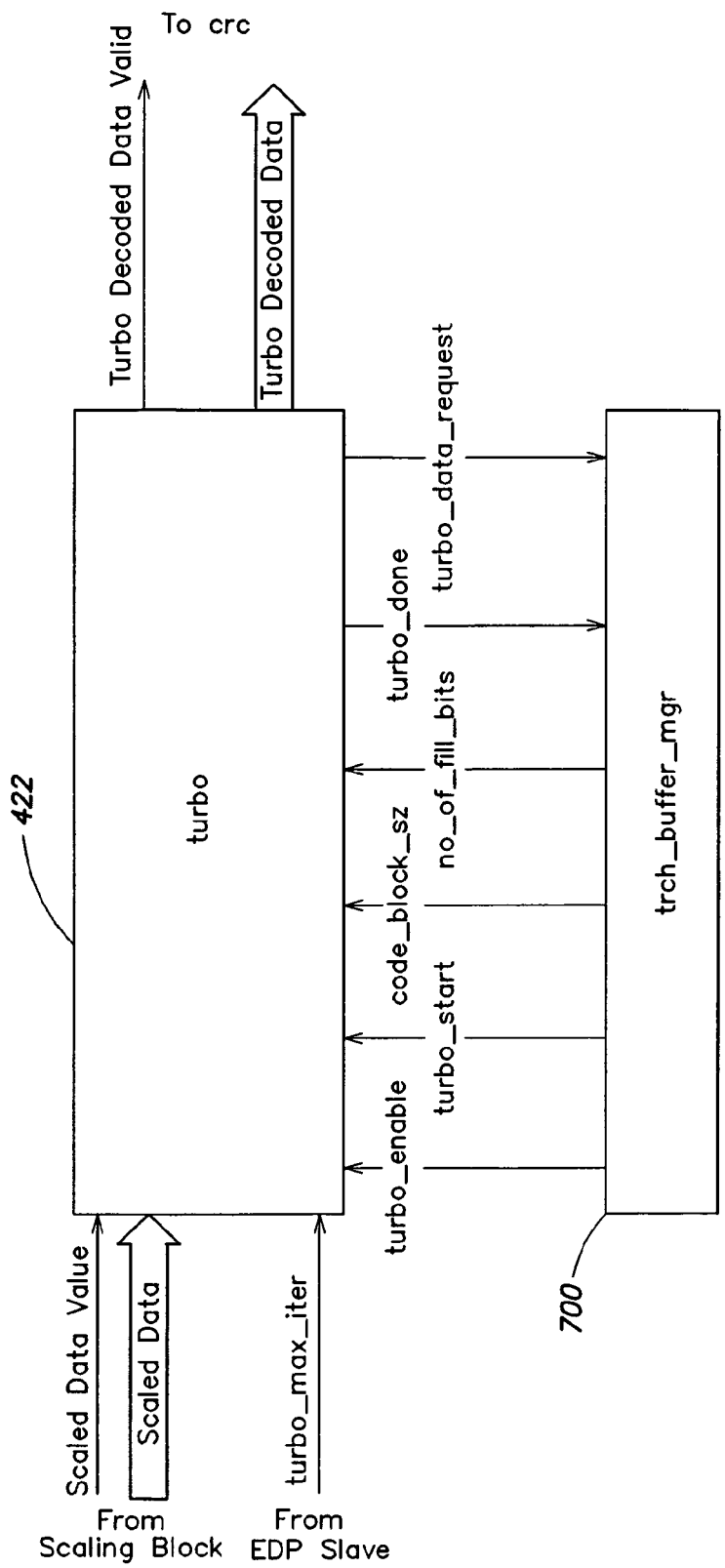
FIG. 26 is a block diagram of the turbo decoder.
Figure 27:
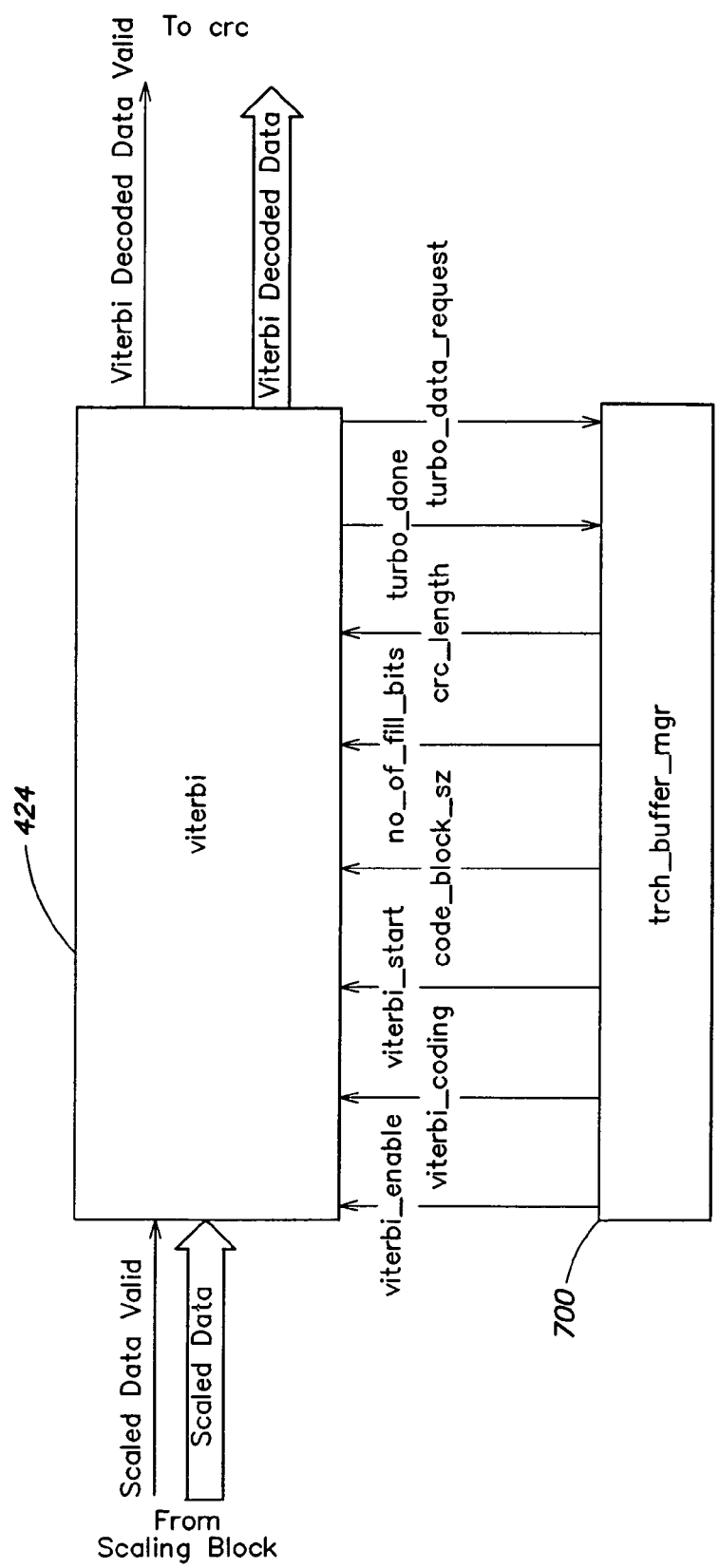
FIG. 27 is a block diagram of the viterbi decoder.

As indicated above, the channel decoder includes turbo decoder 422, viterbi decoder 424 and the option of no decoding. The turbo decoder 422, shown in FIG. 26, may utilize a conventional turbo decoding circuit. Turbo configuration registers may be external to turbo decoder 422 and the parameters are supplied as signals to the turbo decoder. Similarly, viterbi decoder 424, shown in FIG. 27, may utilize a conventional viterbi decoding circuit. Viterbi configuration registers may be external to viterbi decoder 424, with parameters supplied to the viterbi decoder as signals. In the case of no decoding, the decoders 422 and 424 are simply bypassed.

CRC Checker

The CRC checker 428 may be a LFSR (linear feedback shift register) implementation of the CRC polynomial. The data component of the input stream, followed by zeros of CRC length size, is shifted into the LFSR to generate the expected CRC. The actual CRC is compared to the expected CRC to generate pass/fail information.

Output Buffer

Figure 28:
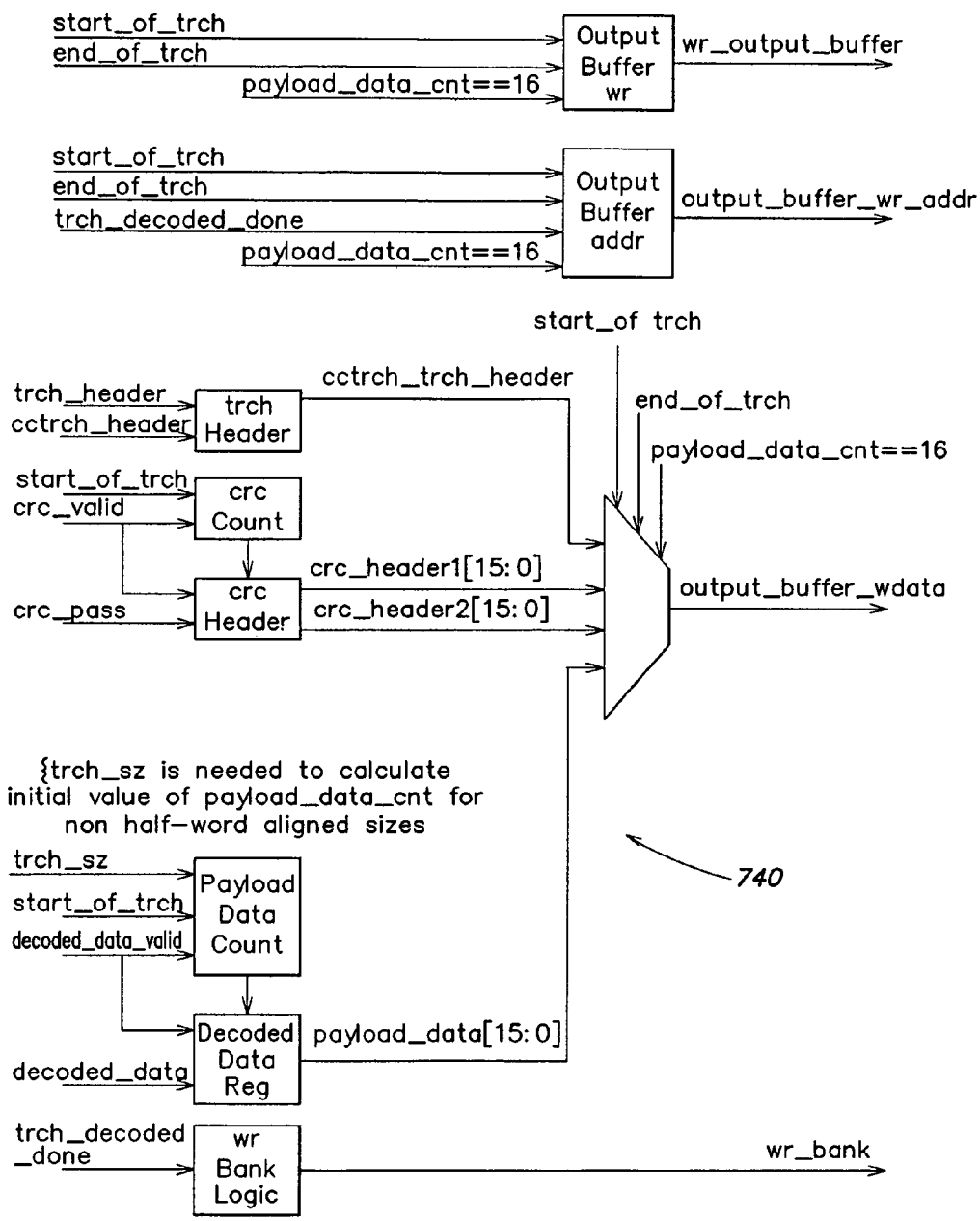
FIG. 28 is a block diagram of the output buffer write logic.
Figure 29A:
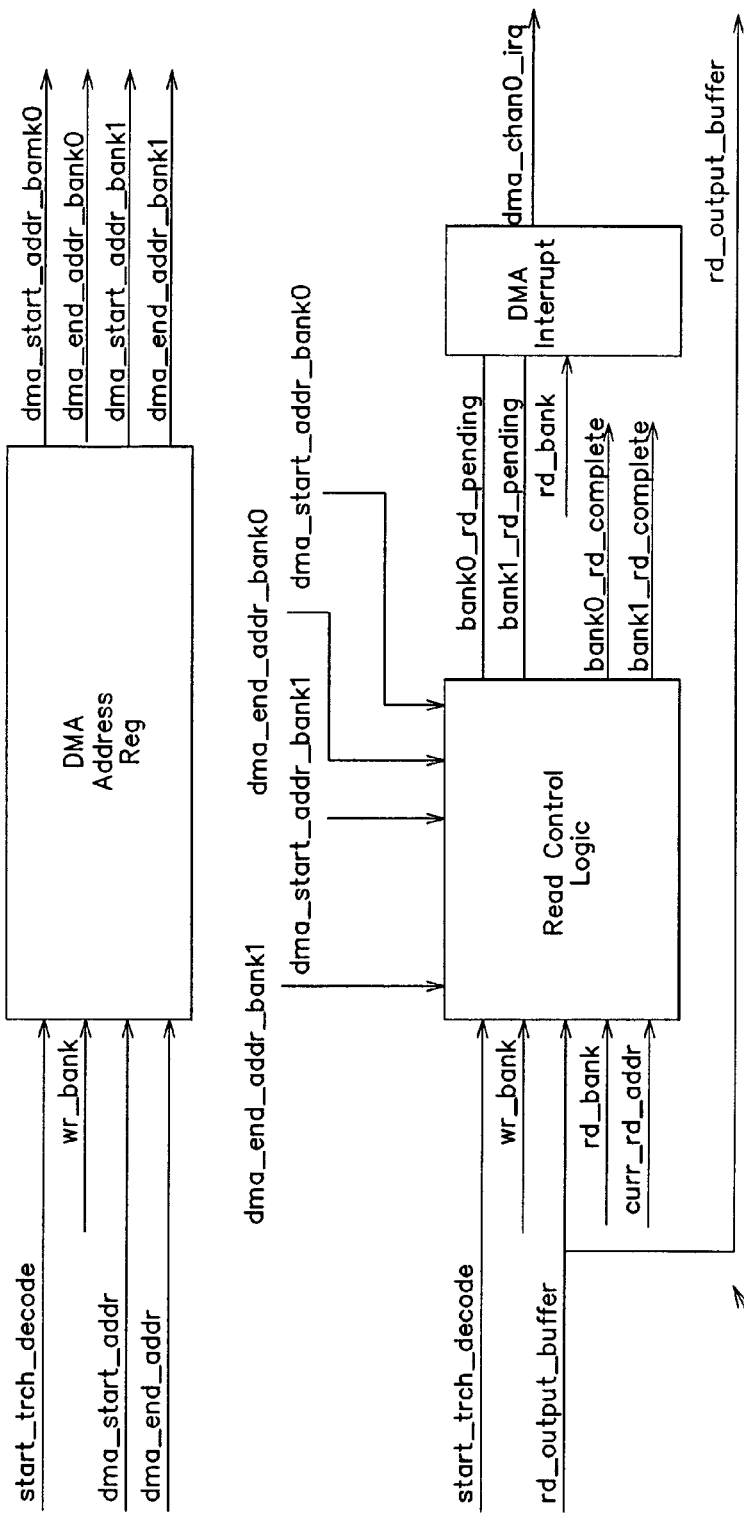
FIG. 29 is a block diagram of the output buffer read logic.
Figure 29B:
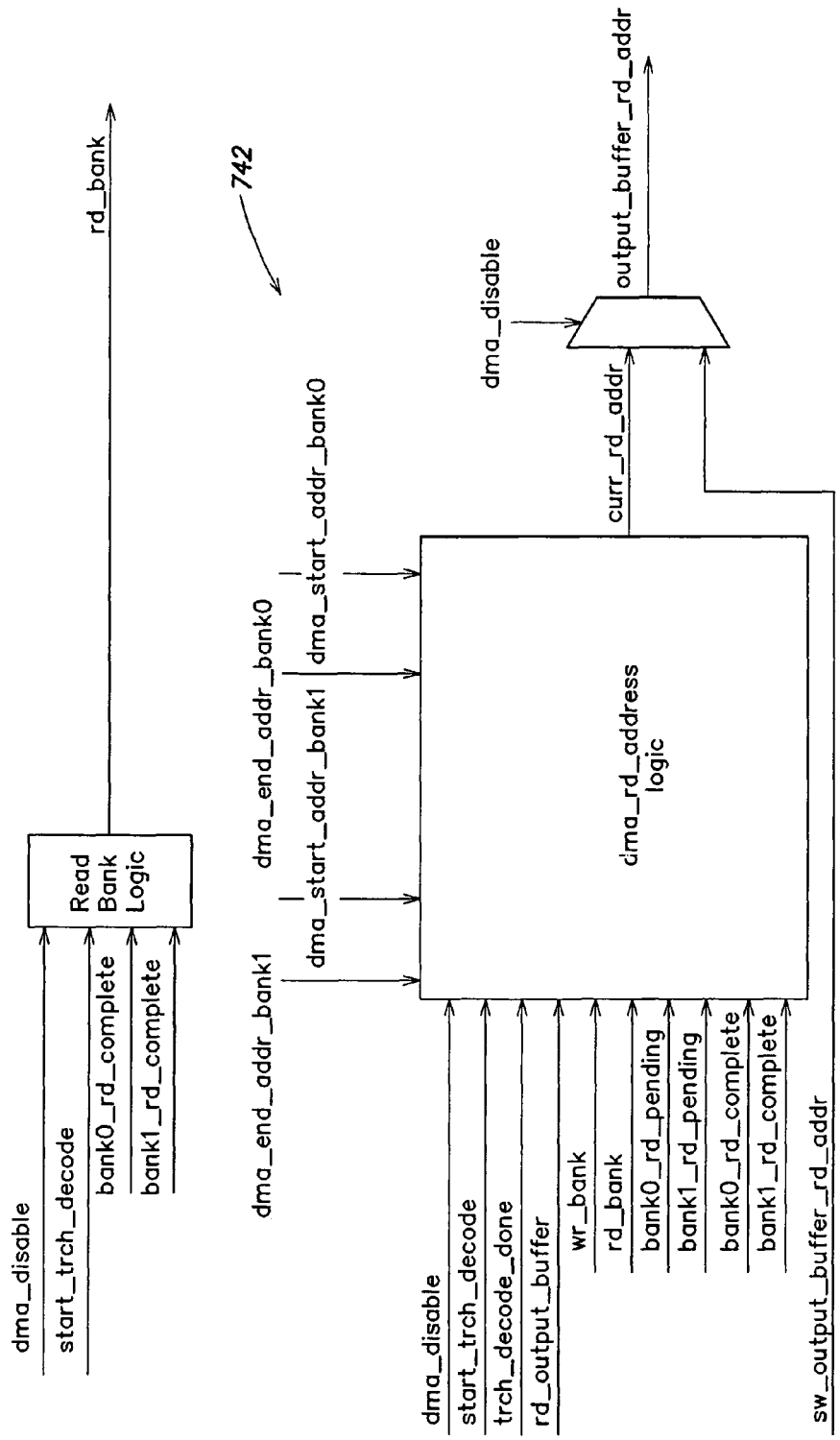

An output buffer manager, shown in FIGS. 28 and 29, controls, reads and writes to the output buffer 324. FIG. 28 shows output buffer write logic 740, and FIG. 29 shows output buffer read logic 742. The output buffer 324 includes two banks of memory to store two frames of decoded data plus CRC status. An internal bank select logic ping-pongs between the two buffers for read and write. The output buffer 324 can be read either by the DSP directly or through the coprocessor DMA.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A bit rate processor to process physical channel data in a wireless receiver, comprising:
   a front end processor configured to process physical channel data from a joint detector, the front end processor comprising a frame buffer configured to receive the physical channel data from the joint detector and hold a frame of the physical channel data, the frame buffer having first and second sections, each for holding a subframe of the physical channel data, wherein each subframe of the physical channel data includes data from a plurality of transport channels, wherein the front end processor further comprises a processing circuit configured to process the frame of the physical channel data, the processing circuit comprising a de-mapping engine to de-map the subframes, wherein the processing circuit is configured to determine whether the physical channel data corresponds to a first spreading code and discard the physical channel data on determining that the physical channel data does not correspond to a first spreading code;
   a transport channel buffer configured to receive encoded transport channel data from the front end processor; and
   a back end processor configured to process the encoded transport channel data from the transport channel buffer to provide decoded transport channel bits, wherein the backend processor operates on a transport channel basis and processes data from the plurality of transport channels.

2. A bit rate processor as defined in claim 1, wherein a fixed amount of space is allocated in the frame buffer for each transport channel and channelization code combination.

3. A bit rate processor as defined in claim 1, wherein the processing circuit processes the physical channel data in response to control parameters associated with the physical channel data.

4. A bit rate processor as defined in claim 3, wherein the processing circuit is triggered to process the physical channel data after a frame of the physical channel data is written to the frame buffer.

5. A bit rate processor as defined in claim 3, wherein the physical channel data and the control parameters are supplied by a control processor.

6. A bit rate processor as defined in claim 3, wherein the control parameters identify active codes in the physical channel data and wherein the processing circuit verifies that the physical channel data written to the frame buffer corresponds to the identified active codes.

7. A bit rate processor as defined in claim 3, wherein the processing circuit is configured to evaluate the physical channel data written to the frame buffer in response to the control parameters.

8. A bit rate processor as defined in claim 3, wherein the control bits are stored separately from the frame buffer.

9. A bit rate processor as defined in claim 1, wherein the physical channel data is written to the frame buffer in bursts, wherein each burst corresponds to a time slot of the frame.

10. A bit rate processor as defined in claim 9, wherein the physical channel data written to the frame buffer has an arbitrary distribution across time slots of the frame.

11. A bit rate processor as defined in claim 1, wherein the physical channel data comprises soft decisions generated by a joint detector.

12. A bit rate processor as defined in claim 11, wherein the de-mapping engine is configured to read the soft decisions generated by the joint detector from the subframes.

13. A bit rate processor as defined in claim 12, wherein the de-mapping engine de-maps the subframes based on a start address of the soft decisions stored in the subframes.

14. A bit rate processor as defined in claim 1, wherein the de-mapping engine is configured to write de-mapped physical channel data to an intermediate frame buffer.

15. A bit rate processor as defined in claim 1, wherein the processing circuit is further configured to identify that the physical channel data corresponds to a second spreading code not identified by the joint detector.

16. A bit rate processor as defined in claim 1, wherein the de-mapping engine independently de-maps the subframes in the first and second sections.

17. A bit rate processor as defined in claim 16, wherein the processing circuit pads data corresponding to a second spreading code with zeros.

18. A method for bit rate processing of physical channel data in a wireless receiver, comprising:
 providing a front end processor configured to process physical channel data from a joint detector, the front end processor comprising a frame buffer configured to hold a frame of the physical channel data from a joint detector, the frame buffer having first and second sections, each for holding a subframe of the physical channel data, each subframe of the physical channel data including data from a plurality of transport channels, the physical channel data corresponding to a first spreading code identified by the joint detector;
 writing the physical channel data to the frame buffer;
 receiving control parameters that correspond to the physical channel data;
 processing the physical channel data written to the frame buffer in accordance with the control parameters, wherein the processing includes de-mapping the physical channel data, determining whether the physical channel data corresponds to a first spreading code and discarding the physical channel data on determining that the physical channel data does not correspond to the first spreading code;
 writing the physical channel data that has been processed, in a transport channel buffer; and
 processing the data from the transport channel buffer at a back end processor to provide decoded transport channel bits, wherein the backend processor operates on a transport channel basis and processes data from the plurality of transport channels.

19. A method as defined in claim 18, wherein providing a frame buffer comprises allocating a fixed amount of space in the frame buffer for each transport channel and channelization code combination.

20. A method as defined in claim 18, wherein processing the physical channel data is triggered after a frame of the physical channel data is written to the frame buffer.

21. A method as defined in claim 18, wherein a control processor supplies the physical channel data to the frame buffer.

22. A method as defined in claim 18, wherein the control parameters identify active codes in the physical channel data and wherein processing the physical channel data includes verifying that the physical channel data written to the frame buffer corresponds to the identified active codes.

23. A method as defined in claim 18, wherein writing physical channel data to the frame buffer comprises writing physical channel data in bursts, wherein each burst corresponds to a time slot of the frame.

24. A method as defined in claim 18, wherein the control bits are held separately from the frame buffer.

25. A method as defined in claim 18, wherein providing a frame buffer includes configuring the frame buffer for compatibility with an arbitrary distribution of transport channels across the subframe.

26. A method as defined in claim 18, wherein processing the physical channel data written to the frame buffer further comprises identifying that the physical channel data corresponds to a second spreading code not identified by the joint detector.

27. A method as defined in claim 26, wherein processing the physical channel data written to the frame buffer includes padding data corresponding to a second spreading code with zeros.

* * * * *